United States Patent
Sakimoto et al.

(10) Patent No.: US 9,768,712 B2
(45) Date of Patent: Sep. 19, 2017

(54) POWER CONVERSION DEVICE CONNECTED TO SINGLE-PHASE SYSTEM

(71) Applicant: KAWASAKI JUKOGYO KABUSHIKI KAISHA, Kobe-shi, Hyogo (JP)

(72) Inventors: Kenichi Sakimoto, Akashi (JP); Yuko Hirase, Kobe (JP); Eiji Yoshimura, Akashi (JP); Shogo Katsura, Akashi (JP); Hidehiko Nakagawa, Himeji (JP); Osamu Noro, Akashi (JP); Yuji Shindo, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/306,696

(22) PCT Filed: Feb. 16, 2015

(86) PCT No.: PCT/JP2015/000691
§ 371 (c)(1),
(2) Date: Oct. 25, 2016

(87) PCT Pub. No.: WO2015/166613
PCT Pub. Date: Nov. 5, 2015

(65) Prior Publication Data
US 2017/0047861 A1    Feb. 16, 2017

(30) Foreign Application Priority Data
Apr. 30, 2014 (JP) .................. 2014-093894

(51) Int. Cl.
*H02M 7/537* (2006.01)
*H02J 3/38* (2006.01)
(Continued)

(52) U.S. Cl.
CPC ............... *H02M 7/537* (2013.01); *H02J 3/38* (2013.01); *H02M 1/42* (2013.01); *H02M 7/5395* (2013.01); *H02M 7/53871* (2013.01)

(58) Field of Classification Search
CPC ........ H02J 3/383; H02J 2003/388; H02J 3/38; H02J 3/386; H02J 3/387; H02J 3/46;
(Continued)

(56) References Cited

U.S. PATENT DOCUMENTS

| 9,413,224 B2 * | 8/2016 | Kouno ..................... H02M 1/36 |
| 2008/0018289 A1 * | 1/2008 | Tajima ..................... H02P 6/18 318/721 |

(Continued)

FOREIGN PATENT DOCUMENTS

| JP | 2009-225599 A | 10/2009 |
| JP | 2010-178495 A | 8/2010 |

(Continued)

OTHER PUBLICATIONS

Apr. 14, 2015 International Search Report issued in International Patent Application No. PCT/JP2015/000691.
(Continued)

*Primary Examiner* — Adolf Berhane
*Assistant Examiner* — Henry Lee, III
(74) *Attorney, Agent, or Firm* — Oliff PLC

(57) ABSTRACT

A power conversion device includes: a power converter to perform output to an output line connected to a single-phase power system; and a control device to control the power converter so it operates as a virtual synchronous generator. The control device includes: a voltage and current measurer to obtain, from a single-phase system voltage, an angular velocity and a phase of the system voltage by an estimation operation that uses the phase of the system voltage as a parameter; a power obtainer to obtain active power and
(Continued)

US 9,768,712 B2

Page 2 reactive power; a governor model to calculate a phase difference; an AVR model to calculate an absolute value of an induced voltage of a virtual synchronous generator; a generator model to calculate current command values corresponding to an armature current of the virtual synchronous generator; and a current controller to generate and output a PWM signal to the power converter.

13 Claims, 14 Drawing Sheets

(51) Int. Cl.
*H02M 1/42* (2007.01)
*H02M 7/5387* (2007.01)
*H02M 7/5395* (2006.01)

(58) Field of Classification Search
CPC ....... H02M 7/53871; H02M 2001/007; H02M 7/53873; H02M 7/5395
See application file for complete search history.

(56) References Cited

U.S. PATENT DOCUMENTS

| 2008/0303489 | A1* | 12/2008 | Park | H02M 5/4585 |
| | | | | 322/20 |
| 2009/0066278 | A1* | 3/2009 | Arisawa | H02P 8/22 |
| | | | | 318/400.35 |
| 2012/0320641 | A1* | 12/2012 | Chapman | H02J 3/383 |
| | | | | 363/37 |
| 2014/0015326 | A1 | 1/2014 | Eberhardt et al. | |
| 2014/0265596 | A1* | 9/2014 | Yuan | H02J 3/382 |
| | | | | 307/69 |
| 2015/0188454 | A1* | 7/2015 | Noritake | H02M 7/53871 |
| | | | | 363/98 |
| 2016/0006338 | A1* | 1/2016 | Sakimoto | H02M 7/53875 |
| | | | | 363/131 |

FOREIGN PATENT DOCUMENTS

| JP | 2012-130146 A | 7/2012 |
| JP | 2013-102670 A | 5/2013 |
| JP | 2013-167500 A | 8/2013 |
| JP | 2013-169052 A | 8/2013 |
| JP | 2014-509824 A | 4/2014 |

OTHER PUBLICATIONS

Siemaszko et al. "Power Compensation Approach and Double Frame Control for Grid Connected Converters", IEEE, pp. 1263-1268, 2013.
Behrooz et al. "Vector Conrol of Single-Phase Voltage-Source Converters Based on Fictive-Axis Emulation", IEEE Transactions on Industry Applications, vol. 47, No. 2, pp. 831-840, 2010.
Nov. 1, 2016 International Preliminary Report on Patentability issued in International Patent Application No. PCT/JP2015/000691.

* cited by examiner

POWER CONVERSION DEVICE CONNECTED TO SINGLE-PHASE SYSTEM

TECHNICAL FIELD

The present invention relates to a power conversion device connected to a single-phase system, and particularly to a power conversion device capable of virtual synchronous generator control.

BACKGROUND ART

In recent years, power supply systems utilizing distributed power supplies such as gas engine generators and fuel cells are drawing increasing attention. For example, there is one proposed system that uses a power generator called a distributed power supply mentioned above to supply electric power from the power generator to a plurality of electrical loads in a particular area. Such a system, which is called a micro grid, is often configured such that a power system therein is connected not only to the aforementioned power generator but also to an energy storage that is equipped with, for example, a secondary battery. The energy storage is provided for compensating for fluctuations in power generation by the power generator as well as load variations. There is also a case where the power system is an AC power system, but the power generator is a DC power generator. In this case, a power conversion device for AC-DC power conversion is necessary.

Such a system utilizing a distributed power supply often assumes interconnected operation in which the system is operated while being interconnected with a commercial electrical grid (see Patent Literatures 1 to 3, for example).

However, there are cases assuming both the interconnected operation and self-sustained operation in which the system is operated independently of the commercial electrical grid. In such a case, it is important to realize stable power supply in both of these operations. Also, the power conversion device is required to have functions that make such stable power supply possible.

In view of the above, the applicant of the present application has recently developed a technique of controlling a power conversion device that has characteristics equivalent to those of a grid-interconnected power generator (i.e., a power conversion device with a generator model). The applicant has proposed a power conversion device that realizes: stable power supply not only during interconnected operation but also during self-sustained operation; and a shift from interconnected operation to self-sustained operation without requiring a changeover of control (see Patent Literature 4). In addition, as disclosed in Patent Literature 5, the applicant has also proposed a technique of stabilizing self-sustained operation by such a power conversion device.

CITATION LIST

Patent Literature

PTL 1: Japanese Laid-Open Patent Application Publication No. 2013-169052
PTL 2: Japanese Laid-Open Patent Application Publication No. 2013-167500
PTL 3: Japanese Laid-Open Patent Application Publication No. 2013-102670
PTL 4: Japanese Laid-Open Patent Application Publication No. 2009-225599
PTL 5: Japanese Laid-Open Patent Application Publication No. 2012-130146

SUMMARY OF INVENTION

Technical Problem

One of the systems utilizing a distributed power supply is a single-phase system (a single-phase power system) that assumes both interconnected operation and self-sustained operation. Conventionally, there have been problems in relation to such a single-phase system as described below.

Specifically, each of the power converters described in Patent Literatures 4 and 5 includes a PLL circuit (a phase detection loop) for detecting a system frequency (angular velocity and phase). The PLL circuit is configured as a unique circuit capable of responding to variations in the system frequency. The reasons why the PLL circuit is configured as such a unique circuit are as follows. The first reason is that in the case of performing self-sustained operation of a system by virtual synchronous generator control using a power converter, the system frequency varies. The second reason is that since a frequency (phase) detection circuit assuming a constant system frequency has been commonly used as in the case of assuming grid-interconnected operation (see Patent Literatures 1 to 3), it has been necessary to originally devise the configuration of a frequency (phase) detection circuit that assumes a varying system frequency. The unique circuit is specifically intended for a three-phase system, and needs to be supplied with a three-phase voltage. If the circuit is applied to a single-phase system, i.e., not supplied with a three-phase voltage, proper operation of the circuit is not guaranteed.

Thus, each of the power converters described in Patent Literatures 4 and 5 has a problem in that if the power converter is applied to a single-phase system, self-sustained operation of the single-phase system by virtual synchronous generator control cannot be performed.

The present invention has been made in order to solve the above-described problems, and an object of the present invention is to provide a power conversion device connected to a single-phase system and capable of causing the single-phase system to perform self-sustained operation by virtual synchronous generator control.

Solution to Problem

In order to solve the above-described problems, a power conversion device according to one aspect of the present invention includes: a power converter configured to convert DC power into single-phase AC power and output the AC power to an output line connected to a single-phase power system; and a control device configured to control the power converter such that the power converter operates as a virtual synchronous generator. The control device includes: a voltage measurer configured to measure a single-phase system voltage, which is a system voltage of the single-phase power system, and from the measured single-phase system voltage, obtain an angular velocity and a phase of the system voltage by an estimation operation that uses the phase of the system voltage as a parameter; a power obtainer configured to obtain active power and reactive power of the single-phase power system; a governor model configured to calculate a phase difference based on a deviation of the active power obtained by the power obtainer from an active power command value, a drooping characteristic of the virtual synchronous generator, and the angular velocity; an AVR model configured to calculate an absolute value of an induced voltage of the virtual synchronous generator based on a deviation of the reactive power obtained by the power obtainer from a reactive power command value and the system voltage that is based on the measurement by the voltage measurer; a generator model configured to calculate current command values corresponding to an armature current of the virtual synchronous generator based on the phase difference calculated by the governor model, the absolute value of the induced voltage calculated by the AVR model, d-axis and q-axis components of the system voltage that correspond to the phase, and an impedance of the virtual synchronous generator; and a current controller configured to generate a PWM signal based on the current command values calculated by the generator model, and output the PWM signal to the power converter.

According to the above configuration, the voltage measurer uses the estimation operation that uses the phase of the system voltage as a parameter. Accordingly, even when the phase of the system voltage (system frequency) has varied, the angular velocity and the phase of the system voltage can be obtained by using the estimation operation, and also, by virtual synchronous generator control using the obtained angular velocity and phase of the system voltage, the single-phase power conversion device can cause the single-phase power system to perform self-sustained operation. Owing to these technical features, shifting between interconnected operation and self-sustained operation of the single-phase power system by the single-phase power conversion device can be performed without requiring a changeover of control.

The voltage measurer may include: a voltage positive sequence component extractor configured to extract, from the measured single-phase system voltage, positive sequence d-axis and q-axis components of the system voltage (hereinafter, simply referred to as d-axis and q-axis components of the system voltage) by DDSRF operation; and an angular velocity and phase obtainer configured to obtain the angular velocity and the phase of the system voltage by using the q-axis component of the system voltage, which is extracted by the voltage positive sequence component extractor. The voltage measurer may be configured to extract the d-axis and q-axis components of the system voltage by using, in the DDSRF operation, the phase obtained by the angular velocity and phase obtainer.

According to the above configuration, the voltage positive sequence component extractor extracts, from the single-phase system voltage, the positive sequence d-axis and q-axis components of the system voltage by the DDSRF operation. Then, the angular velocity and phase obtainer detects the angular velocity and the phase of the system voltage by using the q-axis component of the system voltage. This makes it possible to cause the single-phase power system (single-phase system) to perform self-sustained operation by virtual synchronous generator control. Moreover, unlike the conventional art, it is not necessary to perform an arithmetic operation of an arc tangent function. This makes it possible to simplify the arithmetic operation compared to a case where an arithmetic operation of an arc tangent function is performed. Furthermore, an influence of the negative sequence voltage contained in the single-phase system voltage is eliminated, which makes it possible to stably and smoothly perform virtual synchronous generator control.

The system voltage based on the measurement by the voltage measurer, which is used by the AVR model, may be based on the d-axis and q-axis components of the system voltage that are extracted by the voltage positive sequence component extractor.

According to the above configuration, an influence of the negative sequence components of the system voltage is eliminated, which makes it possible to stably and smoothly perform virtual synchronous generator control.

The d-axis and q-axis components of the system voltage that are used by the virtual generator model and that correspond to the phase may be the d-axis and q-axis components of the system voltage that are extracted by the voltage positive sequence component extractor.

According to the above configuration, disturbance due to negative sequence voltage components is eliminated from the d-axis and q-axis components of the system voltage that are used by the virtual generator model. This makes it possible to stably and smoothly perform virtual synchronous generator control.

The control device may further include a current measurer configured to measure a single-phase system current, which is a system current of the single-phase power system, and from the measured single-phase system current, extract positive sequence d-axis and q-axis components of the system current (hereinafter, simply referred to as d-axis and q-axis components of the system current) by DDSRF operation. The current controller may perform feedback control of the single-phase system current by using, as feedback current values, the d-axis and q-axis components of the system current that are extracted by the current measurer.

The above configuration makes it possible to properly perform feedback control of the single-phase system current.

The current controller may be configured to generate an α-axis voltage command value and a β-axis voltage command value of a rest frame based on feedback current values and the current command values calculated by the generator model, and generate the PWM signal based on the α-axis voltage command value. The voltage measurer may include: an inverse dq transformer configured to calculate a β-axis voltage from the d-axis and q-axis components of the system voltage by performing rest-frame transformation using the phase; a β-axis current calculator configured to calculate a β-axis current by performing FAE operation based on the β-axis voltage calculated by the inverse dq transformer and the β-axis voltage command value generated by the current controller; and a dq transformer configured to measure a single-phase system current, which is a system current of the single-phase power system, convert an α-axis current, which is the measured single-phase system current, and the β-axis current calculated by the β-axis current calculator into d-axis and q-axis components of the system current by using the phase, and output the d-axis and q-axis components of the system current to the current controller as the feedback current values.

The above configuration makes it possible to properly perform feedback control of the single-phase system current by using the d-axis and q-axis components of the system current that are obtained based on the FAE operation.

The angular velocity and phase obtainer may be configured to obtain an angular velocity ω and a phase θ of the system voltage by an arithmetic operation of inputting the q-axis component of the system voltage as a phase detection error (θ−φ) (where θ is an estimated phase of the system voltage and φ is the phase of the system voltage) into a phase detection loop including the voltage measurer.

The above configuration makes it possible to properly obtain the angular velocity ω and phase θ of the system voltage from the q-axis component of the system voltage.

Advantageous Effects of Invention

The present invention makes it possible to provide a power conversion device connected to a single-phase system and capable of causing the single-phase system to perform self-sustained operation by virtual synchronous generator control.

The above object, other objects, features, and advantages of the present invention will be made clear by the following detailed description of preferred embodiments with reference to the accompanying drawings.

Figure 1:
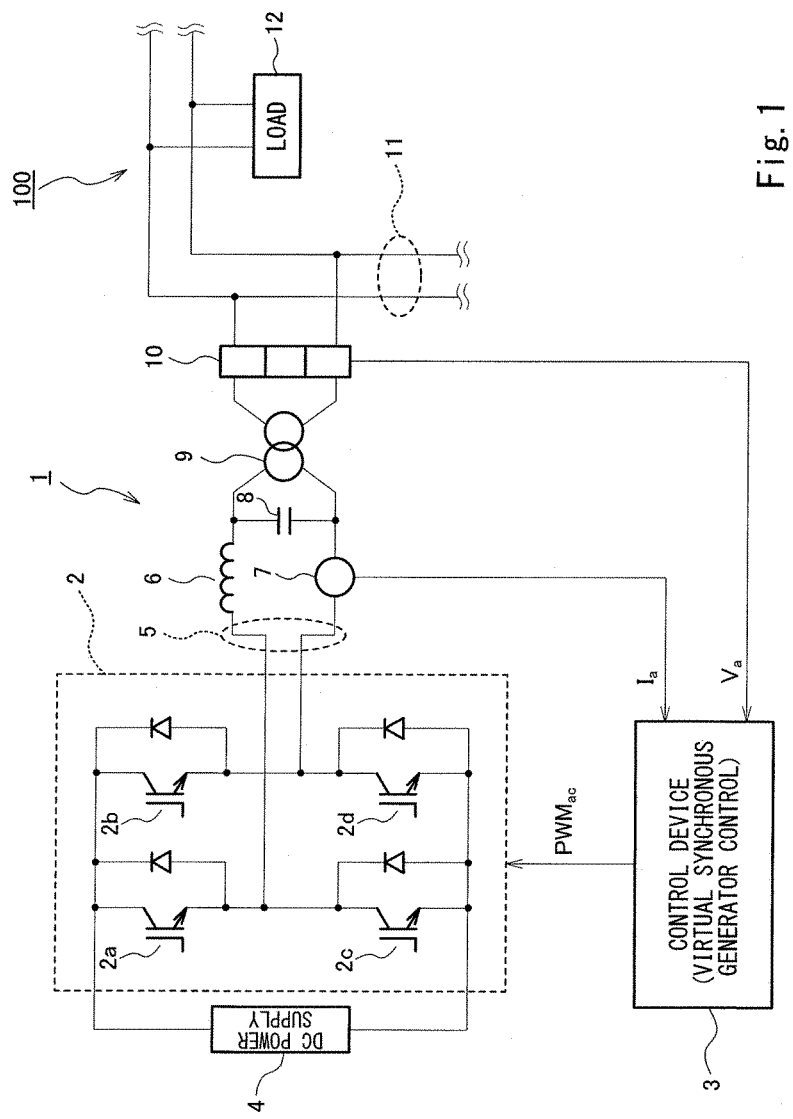
FIG. 1 is a block diagram showing the configuration of a power conversion device according to Embodiment 1 of the present invention.

DESCRIPTION OF EMBODIMENTS (Findings Leading to the Present Invention)

Conventionally, it is known to separate positive sequence components and negative sequence components from each other in an unbalanced three-phase system by using Double Decoupled Synchronous Reference Frame (hereinafter, referred to as DDSRF) (see D. Siemaszko, A. C. Rufer, "Power Compensation Approach and Double Frame Control for Grid Connected Converters," Proc. of IEEE Intrnl. Conf. of Power Electronics and Drive Systems, pp. 1263-1268, 2013). The term "components" herein refer to d-axis and q-axis components in a dq rotating coordinate system. Since DDSRF is an estimation operation that uses the phase of a system voltage as a parameter, DDSRF can respond to variations in the angular velocity of the system voltage. In addition, a single-phase system can be regarded as a special unbalanced state of a three-phase system. The inventors of the present invention focused on these points, and arrived at the application of the DDSRF technique to a phase detection circuit capable of responding to frequency variations in a single-phase inverter.

Hereinafter, embodiments of the present invention are described with reference to the drawings. In the drawings, the same or corresponding components are denoted by the same reference signs, and repeating the same descriptions is avoided. In all the drawings, the letter "s" represents a Laplace operator.

(Embodiment 1)
[Configuration]

FIG. 1 is a block diagram showing the configuration of a power conversion device according to Embodiment 1 of the present invention. As shown in FIG. 1, a power conversion device 1 is, for example, connected to a single-phase power system 100, which is a microgrid, via output lines 5, an output reactor 6, a current sensor 7, a filter capacitor 8, a transformer 9, and a voltage sensor 10. In the present embodiment, power distribution lines 11 of the single-phase power system 100 are two distribution lines forming single-phase two-line wiring (100 V). Alternatively, the power distribution lines 11 may be three distribution lines forming single-phase three-line wiring (100 V/200 V). Examples of the single-phase power system 100 include: a power distribution network for detached houses, apartments, offices, etc.; a power system of a vessel; an electrical grid of an isolated island; and a power system of a factory or the like equipped with a private power generating facility. The single-phase power system 100 is connected to and disconnected from a commercial electrical grid by a disconnector (not shown). When the single-phase power system 100 is connected to the commercial electrical grid, the power conversion device 1 causes the single-phase power system 100 to perform grid-interconnected operation. On the other hand, when the single-phase power system 100 is disconnected from the commercial electrical grid, the power conversion device 1 causes the single-phase power system 100 to perform self-sustained operation.

The power conversion device 1 includes: a DC power supply 4 configured to supply DC power to a power converter 2; the power converter 2 configured to convert the DC power into AC power and output the AC power to the output lines 5 connected to the single-phase power system 100; and a control device 3 configured to control the power converter 2 such that the power converter 2 operates as a virtual synchronous generator.

In the present embodiment, the DC power supply 4 includes: a DC power generating body, such as a solar panel for solar power generation; and a secondary battery, such as a nickel metal hydride battery. Alternatively, the DC power supply 4 may be a distributed power supply utilizing other renewable energy.

Although the power converter 2 is not particularly limited, in the present embodiment, the power converter 2 is formed by four switching elements $2a$ to $2d$, to each of which a diode is connected in an antiparallel manner. For example, IGBTs are used as the switching elements. Based on a control signal $PWM_{ac}$ inputted from the control device 3 into a control terminal of each of the switching elements $2a$ to $2d$ (e.g., the gate terminal of each of the IGBTs), the power converter 2 turns on or off each of the switching elements $2a$ to $2d$, thereby functioning as an inverter.

The control device 3 generates the control signal $PWM_{ac}$ based on a single-phase system voltage $V_a$, which is the system voltage of the single-phase power system 100 detected by the voltage sensor 10, and a single-phase system current $I_a$, which is the system current of the single-phase power system 100 detected by the current sensor 7. The control device 3 supplies the generated control signal $PWM_{ac}$, to the power converter 2. In this manner, the control device 3 controls the power converter 2 such that the power converter 2 operates as a virtual synchronous generator.

Figure 2:
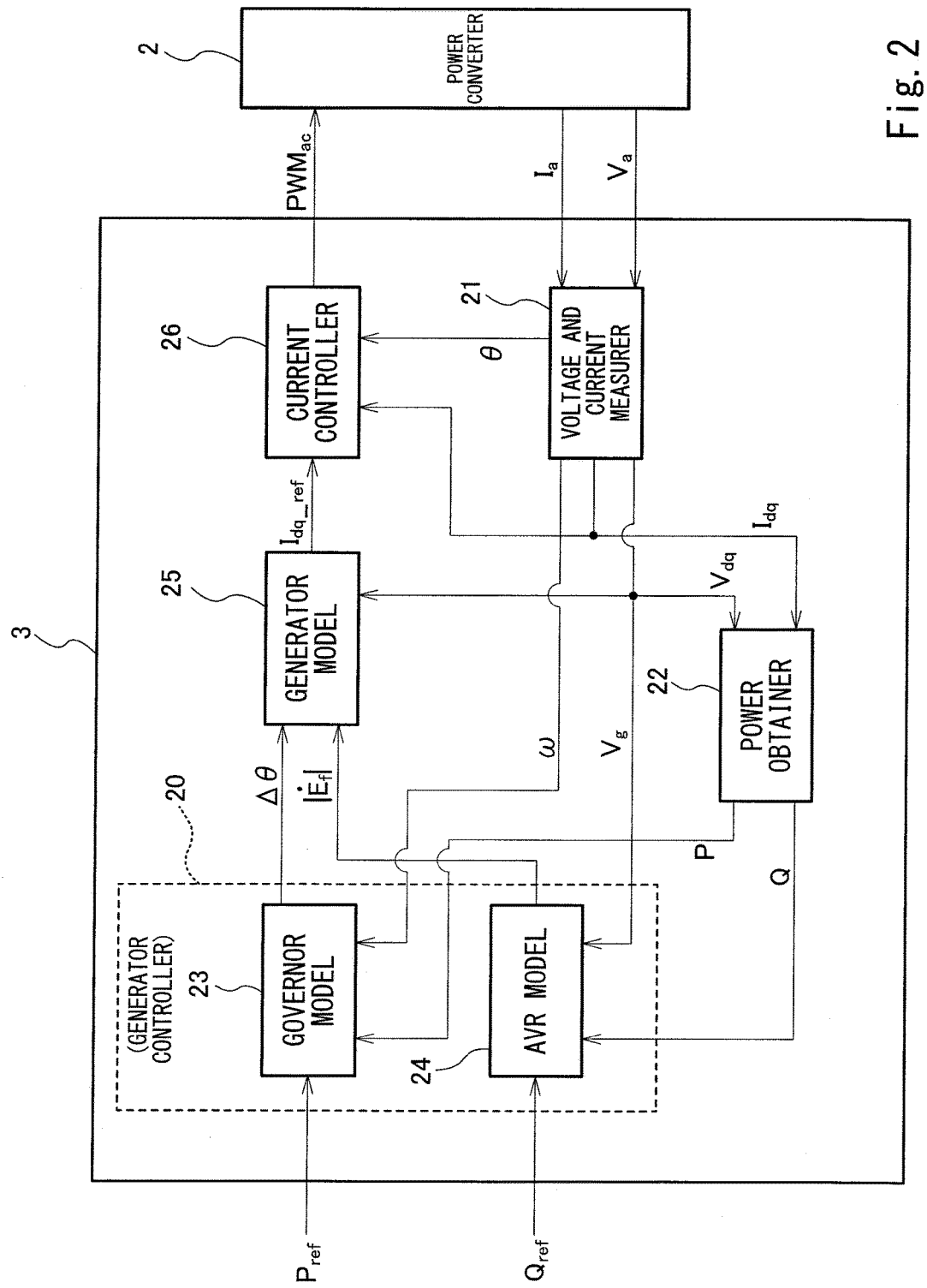
FIG. 2 is a block diagram showing the configuration of a control device of the power conversion device of FIG. 1.

Next, the configuration of the control device 3 is described with reference to FIG. 2. As shown in FIG. 2, the control device 3 includes a voltage and current measurer (serving as a voltage measurer and a current measurer) 21, a power obtainer 22, a generator controller 20, a generator model 25, and a current controller 26. The control device is configured as, for example, an arithmetic operation device such as an FPGA (field programmable gate array), a PLC (programmable logic controller), or a microcontroller. The above components included in the control device 3 are functional blocks, which are realized when the arithmetic operation device executes a program stored therein.

The voltage and current measurer 21 measures the single-phase system voltage $V_a$, which is the system voltage of the single-phase power system 100, and from the measured single-phase system voltage $V_a$, obtains an angular velocity $\omega$ and a phase $\theta$ of the system voltage by an estimation operation that uses the phase of the system voltage as a parameter. The voltage and current measurer 21 also measures the single-phase system current $I_a$, which is the system current of the single-phase power system 100.

The power obtainer 22 obtains active power P and reactive power Q of the single-phase power system 100. In the present embodiment, the power obtainer 22 is configured to calculate the active power P and the reactive power Q based on a system voltage $V_{dq}$ and a system current $I_{dq}$, which are based on the measurement by the voltage and current measurer 21.

The generator controller 20 is an arithmetic operation block, in which functions of a synchronous generator are modeled by using predetermined operation parameters. In the present embodiment, the generator controller 20 includes therein a governor model 23 and an AVR model 24, which are arithmetic operation blocks and are models of a governor and an AVR (Automatic Voltage Regulator) controlling the synchronous generator.

The governor model 23 calculates a phase difference $\Delta\theta$ based on a deviation of the active power P from an active power command value $P_{ref}$, the active power P being obtained by the power obtainer 22, drooping characteristics of the virtual synchronous generator, and the angular velocity $\omega$.

The AVR model 24 calculates the absolute value of an induced voltage of the virtual synchronous generator based on a deviation of the reactive power Q from a reactive power command value $Q_{ref}$, the reactive power Q being calculated by the power obtainer 22, and the system voltage $V_{dq}$, which is based on the measurement by the voltage and current measurer 21. Specific configurations of the governor model 23 and the AVR model 24 will be described below. Although the absolute value of the induced voltage in the drawings is represented by vector notation as shown below, the absolute value is simply written as Ef in the description herein.

[Math. 1]

$$E_f = |\dot{E}_f|)$$

(Absolute Value of Induced Voltage)

The generator model 25 is a model of the body of the synchronous generator. In the present embodiment, the generator model 25 calculates current command values $I_{dq\_ref}$ corresponding to the armature current of the virtual synchronous generator based on the phase difference $\Delta\theta$ calculated by the governor model 23, the absolute value Ef of the induced voltage calculated by the AVR model 24, d-axis and q-axis components $V_{dq}$ of the system voltage, which correspond to the phase $\theta$, and the impedance of the virtual synchronous generator.

The current controller 26 generates a PWM signal PWM_ac based on the current command values $I_{dq\_ref}$ calculated by the generator model 25, and outputs the generated PWM signal PWM_ac to the power converter 2.

Figure 3:
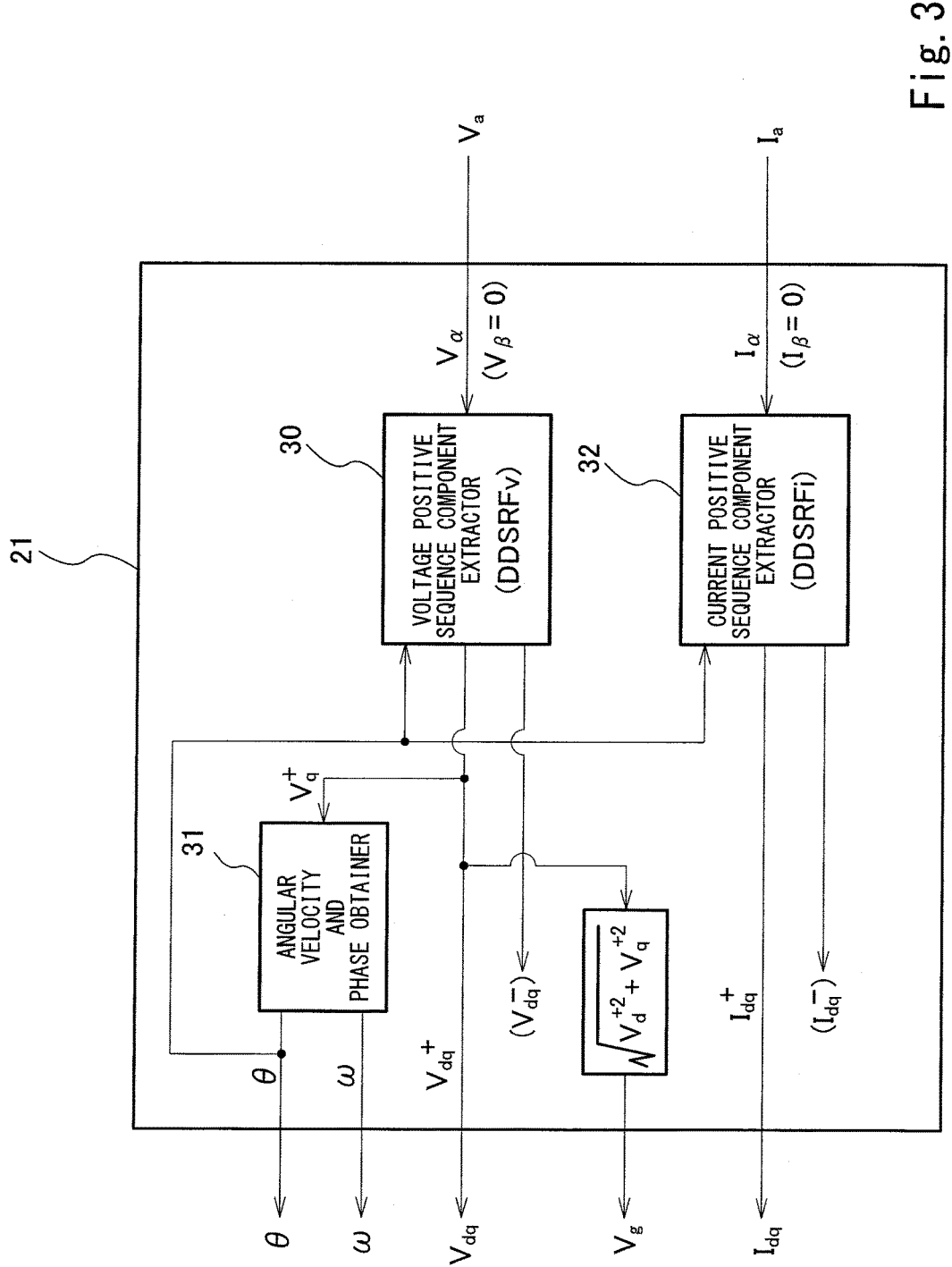
FIG. 3 is a block diagram showing the configuration of a voltage and current measurer of FIG. 2.

Hereinafter, the components of the control device 3 are described in detail. FIG. 3 is a block diagram showing the configuration of the voltage and current measurer 21. As shown in FIG. 3, the voltage and current measurer 21 includes a voltage positive sequence component extractor 30, an angular velocity and phase obtainer 31, and a current positive sequence component extractor 32.

A series of arithmetic operation performed by the voltage positive sequence component extractor 30 is referred to as DDSRF operation. A positive sequence d-axis component $V_d^+$ and a positive sequence q-axis component $V_q^+$ of the system voltage (hereinafter, these components may be simply referred to as a d-axis component and a q-axis component of the system voltage) are extracted from the measured single-phase system voltage $V_a$ by the DDSRF operation. In the DDSRF operation, the d-axis component and q-axis component of the system voltage are extracted by using the phase $\theta$ of the system voltage, which is obtained by the angular velocity and phase obtainer 31 in a manner described below. In the description below, d-axis and q-axis components of a voltage or current may be collectively indicated as $V_{dq}$ ($V_{dq}^+$, $V_{dq}^-$) or $I_{dq}(I_{dq}^+, I_{dq}^-)$. Similarly, $\alpha$-axis and $\beta$-axis components of a voltage or current may be collectively indicated as $V_{\alpha\beta}$ or $I_{\alpha\beta}$. In general, phase voltages $V_a$, $V_b$, and $V_c$ of a three-phase system are converted by Clarke transformation into system phase voltages $V_\alpha$ and $V_\beta$, and then the DDSRF operation is performed on the system phase voltages $V_\alpha$ and $V_\beta$. On the other hand, in the present embodiment, $V_\alpha = V_a$ and $V_\beta = 0$ are inputted into the voltage positive sequence component extractor 30, and the voltage positive sequence component extractor 30 performs the DDSRF operation on the voltage. That is, in the present embodiment, DDSRF is applied to a single-phase system based on a new technical idea of regarding the single-phase system as a special unbalanced state of a three-phase system.

The angular velocity and phase obtainer 31 obtains the angular velocity $\omega$ and the phase $\theta$ of the system voltage by using the q-axis component $V_q^+$ of the system voltage, which is extracted by the voltage positive sequence component extractor 30. The phase $\theta$ is inputted into the voltage positive sequence component extractor 30 as mentioned above, and used in the above-described DDSRF operation performed on the single-phase system voltage $V_a$.

The current positive sequence component extractor 32 extracts a positive sequence d-axis component $I_d^+$ and a positive sequence q-axis component $I_q^+$ of the system current (hereinafter, these components may be simply referred to as a d-axis component and a q-axis component of the system current) from the measured single-phase system current $I_a$ by DDSRF operation using the phase $\theta$ of the system voltage, which is calculated by the angular velocity and phase obtainer 31. In the present embodiment, $I_\alpha = I_a$ and $I_\beta=0$ are inputted into the current positive sequence component extractor 32, and the current positive sequence component extractor 32 performs the DDSRF operation on the current.

Figure 4:
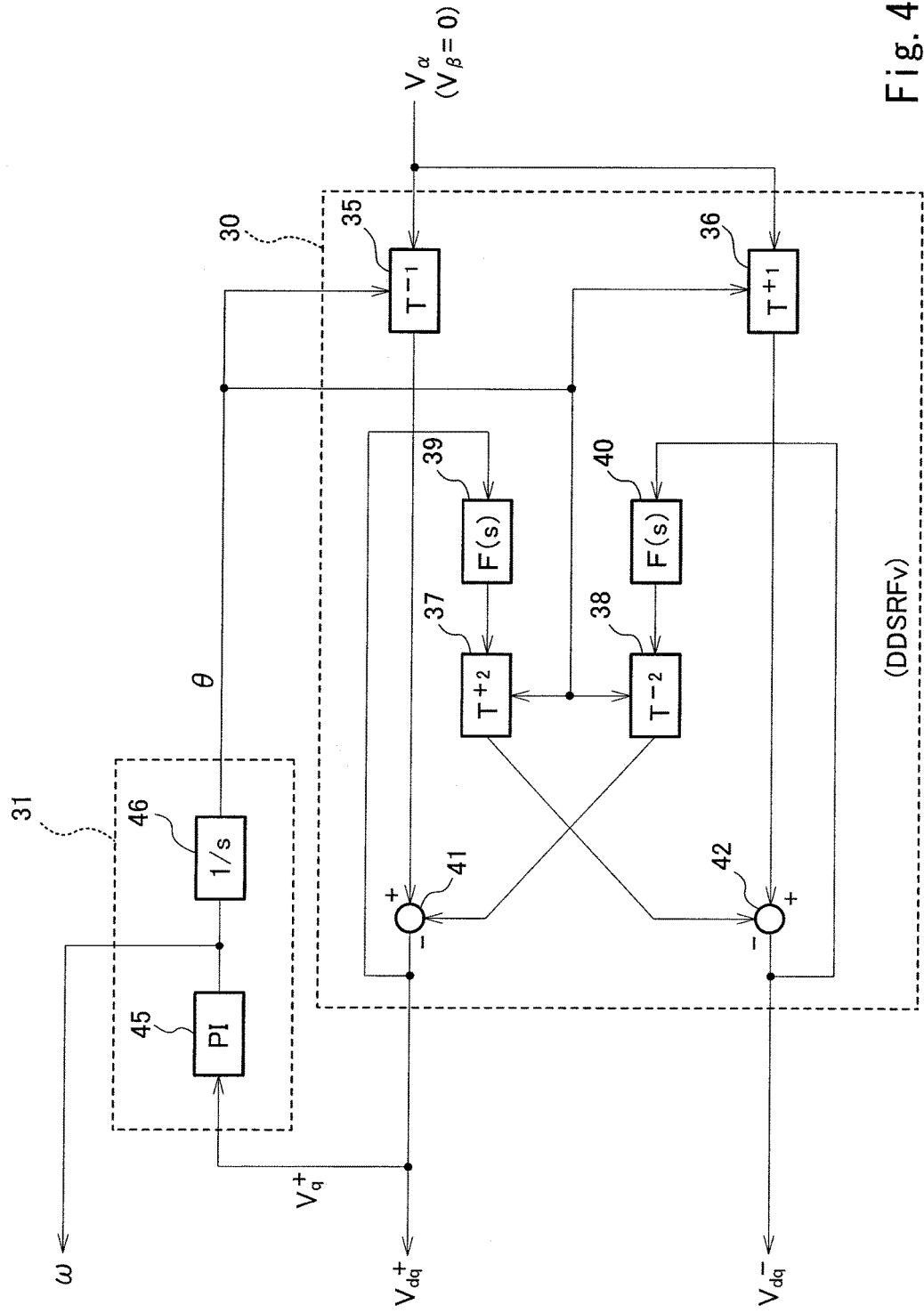
FIG. 4 is a block diagram showing a specific circuit configuration of a voltage positive sequence component extractor of FIG. 3.

Next, a specific circuit configuration of the voltage positive sequence component extractor 30 is described with reference to FIG. 4. As shown in FIG. 4, the voltage positive sequence component extractor 30 includes rotational coordinate transformers 35, 36, 37, and 38, filters 39 and 40, and adder-subtracters 41 and 42.

By using the phase $\theta$ of the system voltage, which is calculated by the angular velocity and phase obtainer 31, the rotational coordinate transformers 35 and 36 calculate a d-axis component and a q-axis component by performing coordinate transformation on the single-phase system voltage $V_\alpha$ ($V_\beta=0$) inputted into the rotational coordinate transformers 35 and 36, and outputs the calculated d-axis component and q-axis component to the adder-subtracter 41. In the present embodiment, each of the rotational coordinate transformers 35 and 36 performs the coordinate transformation by a rotating matrix given by an equation (1) shown below. The coordinate transformation is intended to convert a signal of an $\alpha\beta$ coordinate system into a signal of a dq coordinate system.

[Math. 2]

$$T^\pm = \begin{bmatrix} \cos(\pm\theta) & -\sin(\pm\theta) \\ \sin(\pm\theta) & \cos(\pm\theta) \end{bmatrix} \quad (1)$$

The filter 39 performs filtering on the d-axis and q-axis components $V_{dq}^+$ of the system voltage, which are extracted by the voltage positive sequence component extractor 30, and outputs the resulting components to the rotational coordinate transformer 37. The filter 39 is a low-pass filter (LPF) used for the positive sequence components in order to remove negative sequence components. The cutoff frequency of the LPF is set to be twice the fundamental frequency of the system or less.

By using the phase $2\theta$ of the system voltage, which is obtained by the angular velocity and phase obtainer 31, the rotational coordinate transformer 37 performs coordinate transformation on the d-axis and q-axis components $V_{dq}^+$ of the system voltage, which have been subjected to the filtering, and outputs the resulting components to the adder-subtracter 42.

The filter 40 performs filtering on negative sequence d-axis and q-axis components $V_{dq}^-$ of the system voltage, which are extracted by the voltage positive sequence component extractor 30, and outputs the resulting components to the rotational coordinate transformer 38. The filter 40 is a LPF used for the negative sequence components in order to remove positive sequence components. The cutoff frequency of the LPF is set to be twice the fundamental frequency of the system or less.

By using the phase $2\theta$ of the system voltage, which is obtained by the angular velocity and phase obtainer 31, the rotational coordinate transformer 38 performs coordinate transformation on the negative sequence d-axis and q-axis components $V_{dq}^-$ of the system voltage, which have been subjected to the filtering, and outputs the resulting components to the adder-subtracter 41.

In the present embodiment, each of the rotational coordinate transformers 37 and 38 performs the coordinate transformation by a rotating matrix given by an equation (2) shown below.

[Math. 3]

$$T^{\pm 2} = \begin{bmatrix} \cos(\pm 2\theta) & -\sin(\pm 2\theta) \\ \sin(\pm 2\theta) & \cos(\pm 2\theta) \end{bmatrix} \quad (2)$$

The adder-subtracter 41 calculates positive sequence components $V_{dq}^+$ by subtracting the negative sequence d-axis and q-axis components $V_{dq}^+$, which are inputted from the rotational coordinate transformer 38 and which have been subjected to the filtering and dq inverse transformation, from the d-axis and q-axis components of the single-phase system voltage, which are inputted from the rotational coordinate transformer 35 and which have been subjected to dq transformation. Then, the adder-subtracter 41 outputs the calculated positive sequence components $V_{dq}^+$. Here, the adder-subtracter 41 outputs the positive sequence q-axis component $V_q^+$ of the voltage $V_{dq}^+$ to the angular velocity and phase obtainer 31.

The adder-subtracter 42 calculates negative sequence components $V_{dq}^-$ by subtracting the positive sequence d-axis and q-axis components $V_{dq}^+$, which are inputted from the rotational coordinate transformer 37, from the d-axis and q-axis components of the single-phase system voltage, which are inputted from the rotational coordinate transformer 36 and which have been subjected to dq inverse transformation. Then, the adder-subtracter 42 outputs the calculated negative sequence components $V_{dq}^-$.

In the above-described manner, the voltage positive sequence component extractor 30 separates the system voltage into the positive sequence components $V_{dq}^+$ and the negative sequence components $V_{dq}^+$ by the DDSRF operation, and extracts the d-axis and q-axis components $V_{dq}^+$ of the system voltage.

Next, a specific circuit configuration of the angular velocity and phase obtainer 31 is described with reference to FIG. 4 and FIG. 5.

The angular velocity and phase obtainer 31 includes a PI controller 45 and an integrator 46.

Figure 5A:
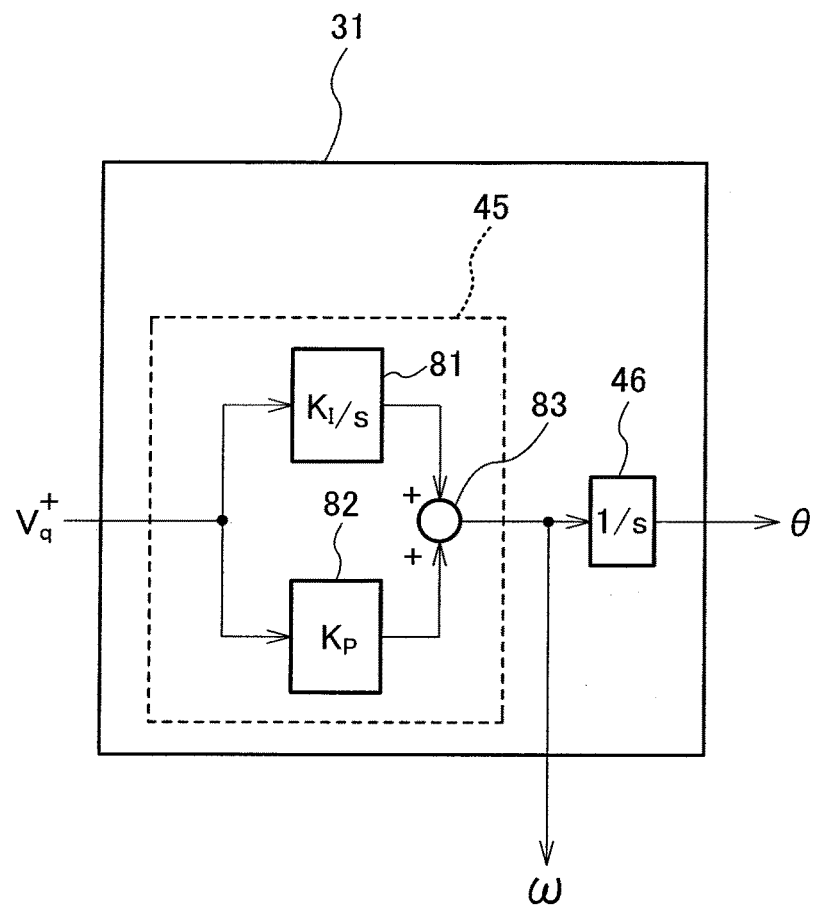
FIGS. 5A and 5B are block diagrams showing a specific circuit configuration of an angular velocity and phase obtainer of FIG. 3.

The PI controller 45 calculates the angular velocity $\omega$ of the system voltage by performing proportional-integral compensation on the q-axis component $V_q^+$ of the system voltage, which is extracted by the voltage positive sequence component extractor 30. The PI controller 45 outputs the calculated angular velocity $\omega$ to the integrator 46. In the present embodiment, as shown in FIG. 5A, the PI controller 45 includes a proportional controller 82, an integration controller 81, and an adder-subtracter 83. Here, a relationship represented by an equation (3) shown below holds true between the system voltage q-axis component $V_q$ and the system voltage $V_g$.

$$V_q = V_g \sin(\theta-\phi) \quad (3)$$

Figure 5B:
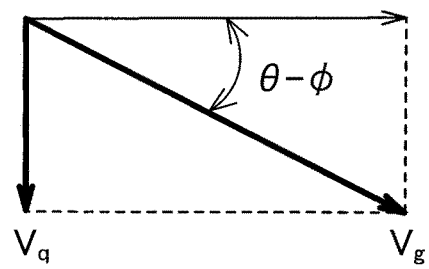

In the equation (3), $V_q$ is the q-axis component of the system voltage; $V_g$ is the system voltage; $\theta$ is an estimated phase of the system voltage; and $\phi$ is the phase of the system voltage. FIG. 5B is a vector diagram illustrating the equation (3). Here, if an estimated phase error $\theta-\phi$ is close to zero, an equation (4) shown below is satisfied.

[Math. 4]

$$\sin(\theta-\phi) \approx \theta-\phi \quad (4)$$

Thus, the angular velocity and phase obtainer 31 is configured to obtain the angular velocity $\omega$ and the phase $\theta$ of the system voltage by an arithmetic operation of inputting the q-axis component of the system voltage as a phase detection error (θ−φ) into a phase detection loop including the voltage positive sequence component extractor 30. In the present embodiment, the q-axis component $V_q$ of the system voltage is inputted into the proportional controller 82 and the integration controller 81 as an estimated phase error θ−φ.

The adder-subtracter 83 adds up the results of arithmetic operations performed by the proportional controller 82 and the integration controller 81, thereby performing proportional-integral compensation on the estimated phase error θ−φ. Then, the adder-subtracter 83 outputs the resulting value to the integrator 46.

The integrator 46 estimates the phase θ by integrating an angular velocity estimated value co of the system voltage, which is inputted from the adder-subtracter 83, and outputs the estimated phase θ to the integrator 46 and the voltage positive sequence component extractor 30. The voltage positive sequence component extractor 30 calculates the q-axis component of the system voltage by using the phase θ. Then, the calculated q-axis component of the system voltage is inputted into the angular velocity and phase obtainer 31. That is, the PI controller 45, the integrator 46, and the voltage positive sequence component extractor 30 form the phase detection loop. It should be noted that the functional block 45 need not be the PI controller 45 performing PI control. Alternatively, the functional block 45 may be configured as a phase compensator, for example.

Figure 6:
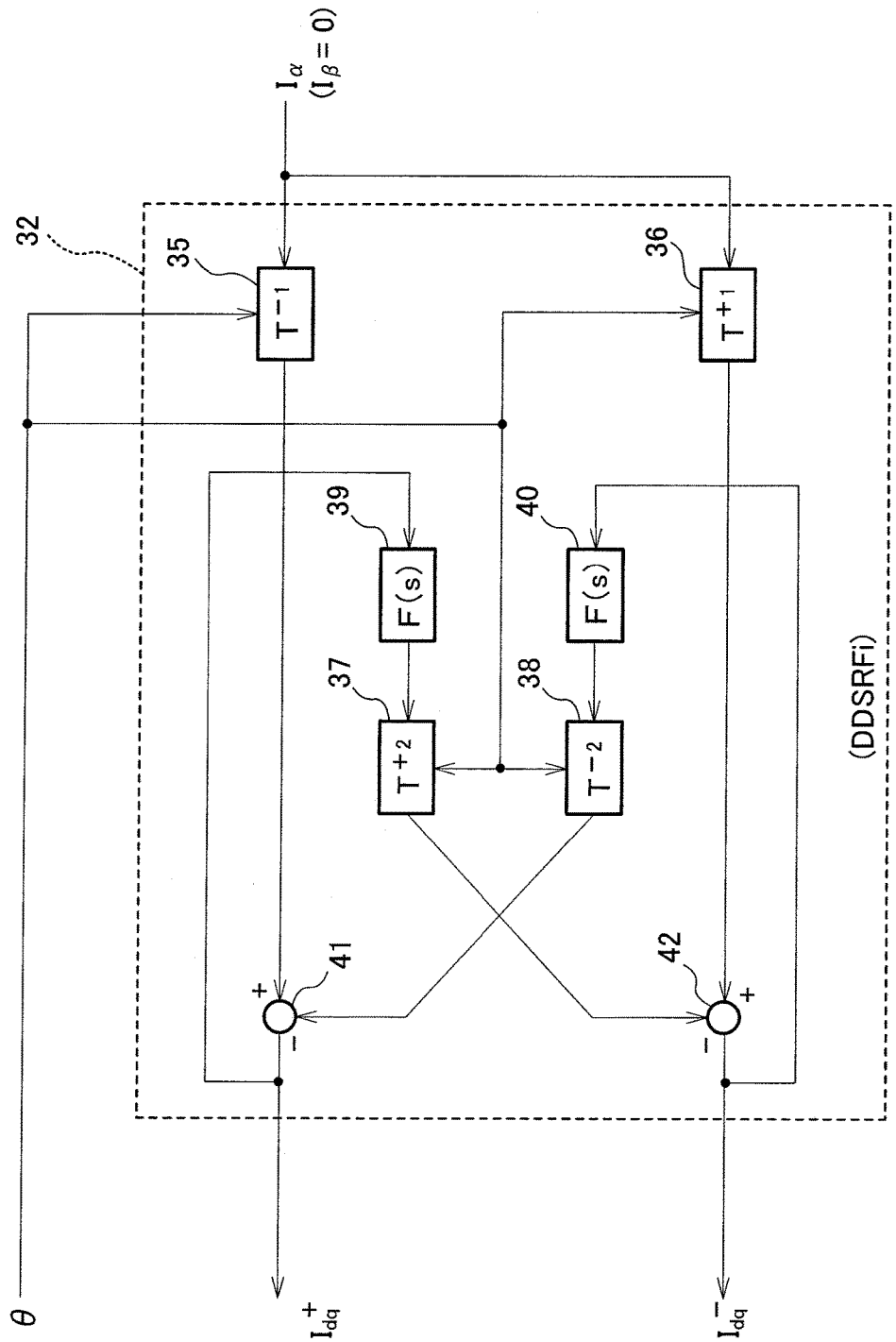
FIG. 6 is a block diagram showing a specific circuit configuration of a current positive sequence component extractor of FIG. 3.

FIG. 6 is a block diagram showing a specific circuit configuration of the current positive sequence component extractor 32. As shown in FIG. 6, the current positive sequence component extractor 32 includes the rotational coordinate transformers 35, 36, 37, and 38, the filters 39 and 40, and the adder-subtracters 41 and 42. Single-phase signals $I_\alpha=I_a$ and $I_\beta=0$ are inputted into the current positive sequence component extractor 32, and the current positive sequence component extractor 32 performs DDSRF operation on the current in a manner similar to the DDSRF operation performed by the voltage positive sequence component extractor 30. That is, in the voltage and current measurer 21, the current positive sequence component extractor 32 separates the system voltage into positive sequence components $I_{dq}^+$ and negative sequence components $I_{dq}^+$ by the DDSRF operation, and extracts the d-axis and q-axis components $I_{dq}^+$ of the system current.

Figure 7:
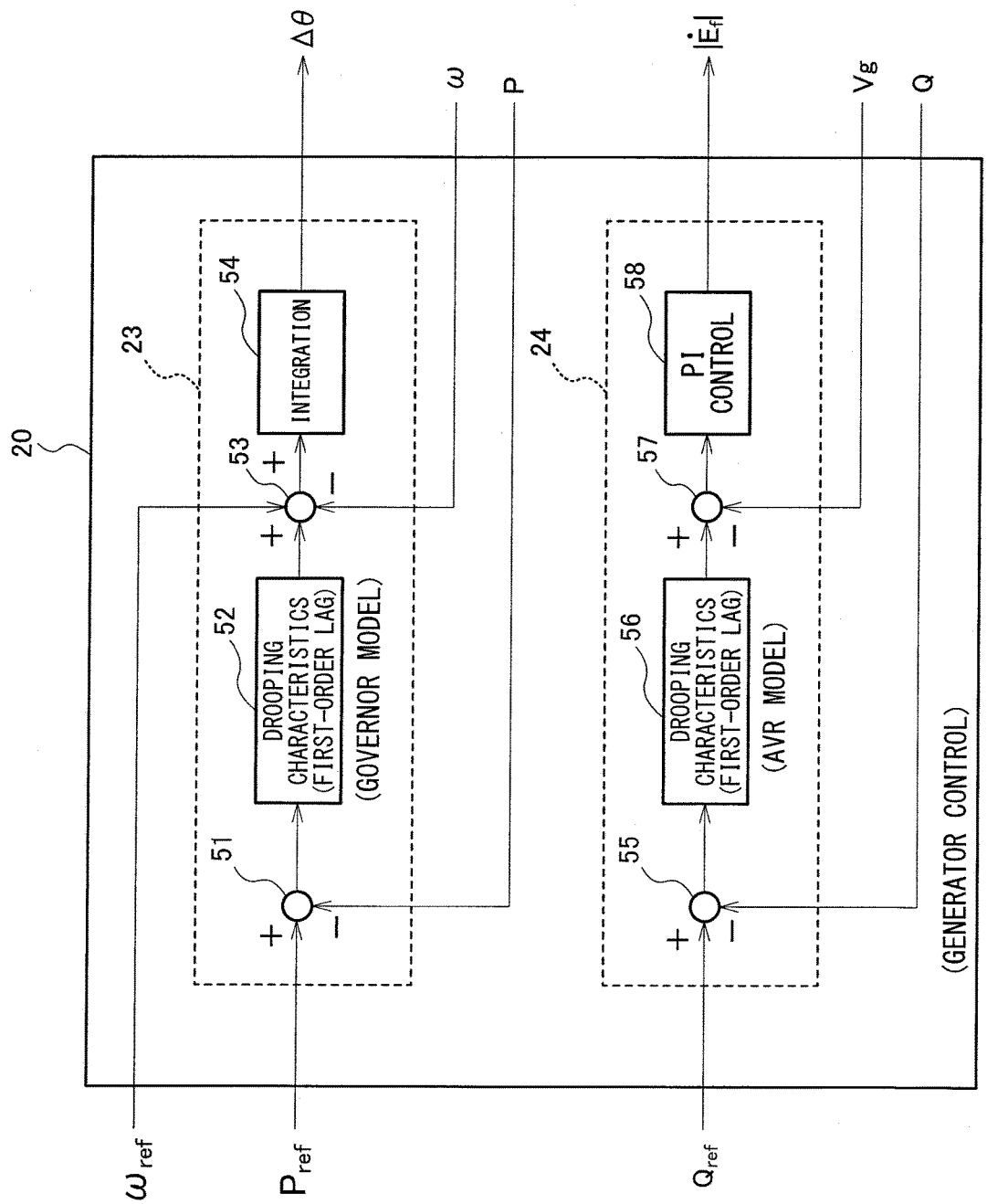
FIG. 7 is a block diagram showing the configuration of a virtual synchronous generator controller of the control device of FIG. 2.

Next, specific configurations of the governor model 23 and the AVR model 24 forming the virtual synchronous generator controller 20 are described with reference to FIG. 7. As shown in FIG. 7, an active power command value $P_{ref}$ and an angular velocity reference value $\omega_{ref}$ are inputted into the governor model 23 from the outside (for example, from a microgrid control device). In addition, the active power P is inputted into the governor model 23 from the power obtainer 22, and the angular velocity ω is inputted into the governor model 23 from the voltage and current measurer 21. Here, the active power command value $P_{ref}$ inputted into the governor model 23 corresponds to the torque of the power generator, and sets a frequency at which the power generator is synchronized with the power system.

Specifically, the governor model 23 includes an adder-subtracter 51, a droop block 52, an adder-subtracter 53, and an integrator 54. The adder-subtracter 51 outputs a value that is a result of subtracting the active power P from the active power command value $P_{ref}$ to the droop block 52. The droop block 52 outputs, to the adder-subtracter 53, a value that is a result of performing a predetermined arithmetic operation on the output from the adder-subtracter 51 in accordance with drooping characteristics of the governor (e.g., a value obtained by multiplying the output from the adder-subtracter 51 by a gain $K_{gd}$, which is a real constant). The adder-subtracter 53 outputs, to the integrator 54, a value that is a result of subtracting the angular velocity ω from the sum of the angular velocity reference value $\omega_{ref}$ and the output value of the droop block 52. The integrator 54 calculates a phase difference Δθ by integrating the angular velocity deviation inputted from the adder-subtracter 53, and outputs the calculated phase difference Δθ to the generator model 25.

A reactive power command value $Q_{ref}$ is inputted into the AVR model 24 from the outside (e.g., from the microgrid control device). Here, the reactive power command value $Q_{ref}$ inputted into the AVR model 24 corresponds to the magnetic field of the power generator, and adjusts the induced voltage. In addition, the reactive power Q is inputted into the AVR model 24 from the power obtainer 22, and the system voltage $V_g$ based on the measurement by the voltage and current measurer 21 is inputted into the AVR model 24. The system voltage $V_g$ is based on the d-axis component $V_d^+$ and the q-axis component $V_q^+$ of the system voltage, which are extracted by the voltage positive sequence component extractor 30. The system voltage $V_g$ is calculated by using an equation (5) shown below.

[Math. 5]

$$V_g = \sqrt{V_q^{+2} + V_d^{+2}} \qquad (5)$$

Specifically, the AVR model 24 includes an adder-subtracter 55, a droop block 56, an adder-subtracter 57, and a PI control block 58.

The adder-subtracter 55 outputs a value that is a result of subtracting the reactive power Q from the reactive power command value $Q_{ref}$ (i.e., a reactive power deviation) to the droop block 56. The droop block 56 imparts a first-order lag to a value that is a result of performing a predetermined arithmetic operation on the output from the adder-subtracter 55 in accordance with drooping characteristics of the AVR (e.g., a value obtained by multiplying the output from the adder-subtracter 55 by a gain $K_{ad}$, which is a real constant). The adder-subtracter 55 outputs the resulting value to the adder-subtracter 57. The adder-subtracter 57 outputs, to the PI control block 58, a value that is obtained by subtracting the system voltage $V_g$ from the output from the block 56. The PI control block 58 calculates the absolute value Ef of the induced voltage by performing proportional-integral compensation on the output from the adder-subtracter 57, and outputs the calculated absolute value Ef to the generator model 25.

As described above, each of the governor model 23 and the AVR model 24 has a first order lag function for realizing the drooping characteristics of the virtual synchronous generator. The phase difference Δθ of the virtual synchronous generator, which is calculated by the governor model 23, and the absolute value Ef of the induced voltage, which is calculated by the AVR model 24, are inputted into the virtual generator model 25.

Figure 8:
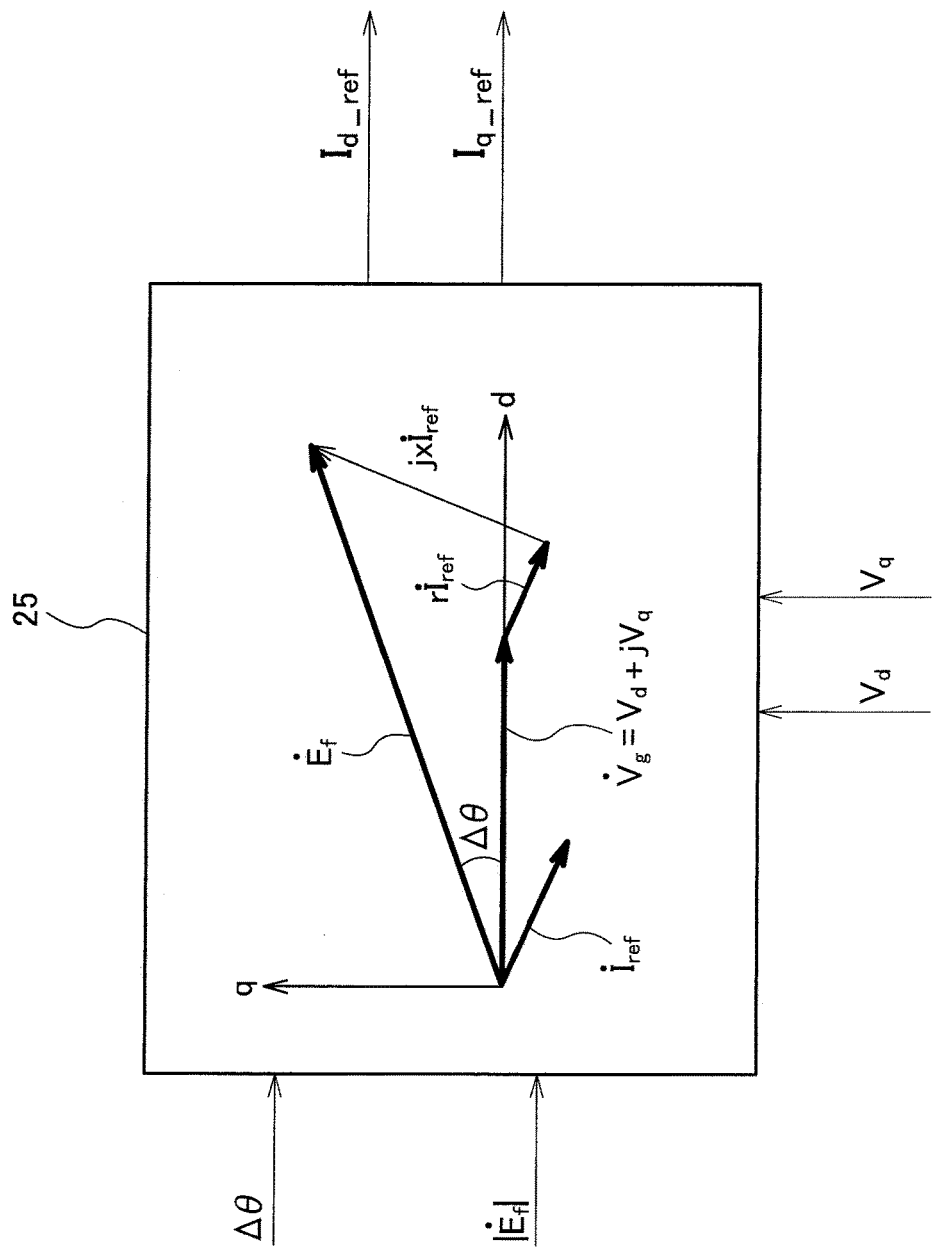
FIG. 8 is a block diagram showing the details of a virtual generator model of the control device of FIG. 2.

FIG. 8 shows the details of the virtual generator model 25. The virtual synchronous generator is modeled by using: the absolute value Ef of the induced voltage generated by the magnetic field of the virtual synchronous generator; the phase difference Δθ of the virtual synchronous generator; the impedance of the virtual synchronous generator due to a winding reactance x and a winding resistance r of a virtual armature of the virtual synchronous generator; and a voltage outputted from the virtual synchronous generator, i.e., a system voltage (a complex voltage vector), and a current outputted from the virtual synchronous generator (a complex current vector). FIG. 8 is a phasor diagram showing each vector of the virtual generator model 25. It should be noted that, in FIG. 8, the complex voltage vector of the system voltage and the complex current vector of the current are represented by vector notation as shown below. $V_g$ in Math. 5 is the absolute value of the complex voltage vector of the system voltage in Math. 6.

[Math. 6]

$$\dot{V}_g$$

(Complex voltage vector of the system voltage)

$$\dot{i}_{ref}$$

(Complex current vector)

The d-axis and q-axis components $I_{d\_ref}$ and $I_{q\_ref}$ of the complex current vector in Math. 6 are calculated by equations (6) and (7) shown below.

[Math. 7]

$$\Delta V_d = E_f \cos \Delta\theta - V_d$$

$$\Delta V_q = E_f \sin \Delta\theta - V_q \quad (6)$$

Here, the d-axis component $V_d^+$ and the q-axis component $V_q^+$ of the system voltage, which are extracted by the voltage positive sequence component extractor 30, are used as the d-axis component $V_d$ and the q-axis component $V_q$ of the system voltage in the equation (6).

[Math. 8]

$$I_{d\_ref} = \frac{1}{r^2 + x^2}(r\Delta V_d + x\Delta V_q) \quad (7)$$

$$I_{q\_ref} = \frac{1}{r^2 + x^2}(r\Delta V_q - x\Delta V_d)$$

In the present embodiment, the current controller 26 performs feedback control of the single-phase system current by using the d-axis and q-axis components $I_{d\_ref}$ and $I_{q\_ref}$, which are calculated by the generator model 25, as current command values and using the d-axis and q-axis components $I_d$ and $I_q$ of the system current, which are extracted by the voltage and current measurer 21, as feedback current values.

Figure 9:
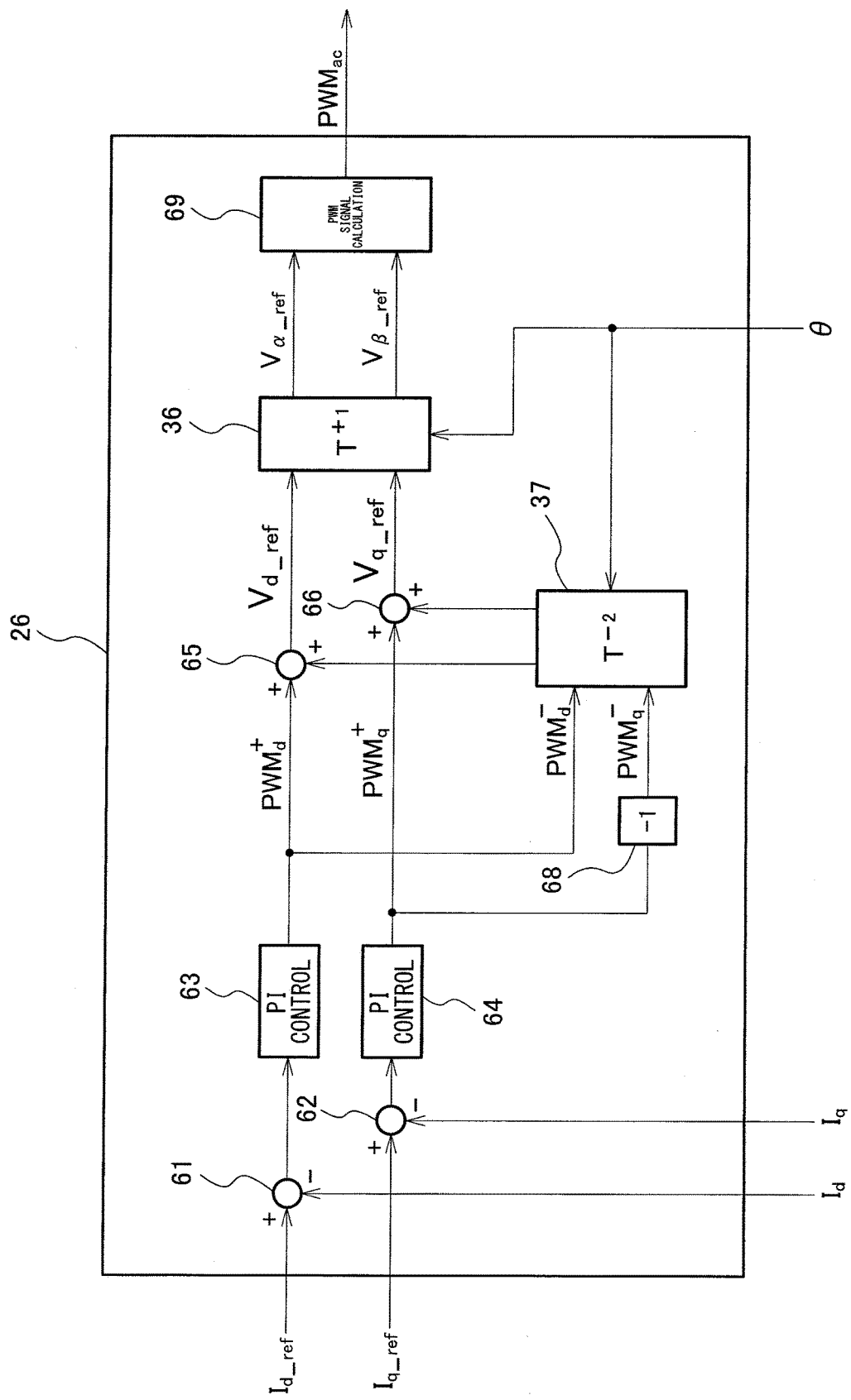
FIG. 9 is a block diagram showing the configuration of a current controller of FIG. 3.

FIG. 9 is a block diagram showing the configuration of the current controller 26. As shown in FIG. 9, the current controller 26 includes adder-subtracters 61 and 62, PI control blocks 63 and 64, adder-subtracters 65 and 66, rotational coordinate transformers 36 and 37, multipliers 67 and 68, and a PWM signal calculator 69.

The adder-subtracter 61 subtracts the d-axis component $I_d$ of the system current (to be exact, the positive sequence component $I_d^+$), which is inputted from the voltage and current measurer 21, from the d-axis current command value $I_{d\_ref}$ inputted from the virtual generator model 25. Then, the adder-subtracter 61 outputs the resulting value to the PI control block 63. The PI control block 63 calculates a d-axis voltage command value $PWM_d^+$, which is a positive sequence component, by performing proportional-integral compensation on the output from the adder-subtracter 61, and outputs the calculated d-axis voltage command value to the adder-subtracter 65. Here, the d-axis voltage command value outputted from the PI control block 63 is the positive sequence component $PWM_d^+$ only. However, in a single phase, the negative sequence component $PWM_d^-$ is the same as the positive sequence component $PWM_d^+$. Therefore, the PI control block 63 outputs the calculated d-axis voltage command value to the rotational coordinate transformer 37 also as a negative sequence component $PWM_d^-$.

The adder-subtracter 62 subtracts the q-axis component $I_q$ of the system current (to be exact, the positive sequence component $I_q^+$), which is inputted from the voltage and current measurer 21, from the q-axis current command value $I_{q\_ref}$ inputted from the virtual generator model 25. Then, the adder-subtracter 62 outputs the resulting value to the PI control block 64. The PI control block 64 calculates a q-axis voltage command value $PWM_q^+$, which is a positive sequence component, by performing proportional-integral compensation on the output from the adder-subtracter 62, and outputs the calculated q-axis voltage command value to the adder-subtracter 66. Here, the q-axis voltage command value outputted from the PI control block 64 is the positive sequence component $PWM_q^+$ only. However, in a single phase, since the sign of the negative sequence component $PWM_q^-$ is different from that of the positive sequence component $PWM_q^+$, the multiplier 68 multiplies the positive sequence component $PWM_q^+$ by −1, and outputs the resulting value to the rotational coordinate transformer 37 as the negative sequence component $PWM_q^-$.

The rotational coordinate transformer 37 performs coordinate transformation on the d-axis and q-axis voltage command values $PWM_d^-$ and $PWM_q^-$, which are negative sequence components, by using the phase 2θ of the system voltage, which is obtained by the angular velocity and phase obtainer 31, and outputs the resulting values to the adder-subtracters 65 and 66.

The adder-subtracter 65 adds the d-axis voltage command value $PWM_d^-$, which is a negative sequence component inputted from the rotational coordinate transformer 37 and which has been subjected to the coordinate transformation, to the d-axis voltage command value $PWM_d^+$, which is a positive sequence component inputted from the PI control block 63, thereby calculating a d-axis voltage command value $V_{d\_ref}$, and outputs the d-axis voltage command value $V_{d\_ref}$ to the rotational coordinate transformer 36.

The adder-subtracter 66 adds the q-axis voltage command value $PWM_q^-$, which is a negative sequence component inputted from the rotational coordinate transformer 37 and which has been subjected to the coordinate transformation, to the q-axis voltage command value $PWM_q^+$, which is a positive sequence component inputted from the PI control block 64, thereby calculating a q-axis voltage command value $V_{q\_ref}$, and outputs the q-axis voltage command value $V_{q\_ref}$ to the rotational coordinate transformer 36.

The rotational coordinate transformer 36 performs coordinate transformation on the d-axis and q-axis voltage command values $V_{d\_ref}$ and $V_{q\_ref}$ by using the phase θ of the system voltage, which is obtained by the angular velocity and phase obtainer 31, thereby calculating α-axis and β-axis voltage command values $V_{\alpha\_ref}$ and $V_{\beta\_ref}$ and outputting the voltage command values $V_{\alpha\_ref}$ and $V_{\beta\_ref}$ to the PWM signal calculator 69.

The PWM signal calculator 69 calculates a PWM signal $PWM_{ac}$, based on the α-axis and β-axis voltage command values $V_{\alpha\_ref}$ and $V_{\beta\_ref}$ inputted from the rotational coordinate transformer 36, and outputs the PWM signal $PWM_{ac}$ to the power converter 2.

[Functional Advantages]

According to the power conversion device 1 with the above-described configuration, the voltage and current measurer 21 uses the estimation operation that uses the phase of the system voltage as a parameter, and the voltage and current measurer 21 obtains the angular velocity ω and the phase θ of the system voltage by using the estimation operation on the varying phase of the system voltage (system frequency ω). In addition, the voltage positive sequence component extractor 30 extracts the positive sequence d-axis component $V_d^+$ and the positive sequence q-axis component $V_q^+$ of the system voltage from the single-phase system voltage by the DDSRF operation. Consequently, virtual synchronous generator control can be realized in the single-phase power system 100. Owing to these technical features, shifting between interconnected operation and self-sustained operation of the single-phase power system 100 by the power conversion device 1 can be performed without requiring a changeover of control by utilizing the following characteristics of the virtual synchronous generator control: change the phase difference and induced voltage as necessary, thereby realizing power control that follows variations in the system frequency and system loads.

Further, in the above-described estimation operation, the angular velocity and phase obtainer 31 detects the angular velocity ω and the phase θ of the system voltage by using the q-axis component $V_q^+$ of the system voltage. Therefore, unlike the conventional art, it is not necessary to perform an arithmetic operation of an arc tangent function. This makes it possible to simplify the arithmetic operation compared to a case where an arithmetic operation of an arc tangent function is performed.

Still further, the AVR model 24 and the generator model 25 use the system voltage that is based on the d-axis and q-axis components of the system voltage from which negative sequence components have been completely removed by the voltage positive sequence component extractor 30. Therefore, unlike a case where the d-axis and q-axis components are obtained by calculating the phase and amplitude directly from the zero-crossing point, peak value, root mean square value, etc., of the waveform of a single-phase system voltage, there is no risk of a negative sequence voltage being mixed, and thereby disturbance due to a negative sequence voltage is eliminated, which makes it possible to smoothly and stably perform virtual synchronous generator control.

Still further, the control device 3 includes the voltage and current measurer 21 configured to measure a single-phase system current, which is the system current of the single-phase power system 100, and from the measured single-phase system current, extract positive sequence d-axis and q-axis components of the system current by the DDSRF operation. The current controller 26 performs feedback control of the single-phase system current by using, as feedback current values, the d-axis component $I_d$ and the q-axis component $I_q$ of the system current, which are extracted by the voltage and current measurer 21. This makes it possible to perform proper feedback control of the single-phase system current.

Still further, the angular velocity and phase obtainer 31 is configured to calculate (θ−φ) for the q-axis component of the system voltage by using the equation of $V_q = V_g \sin(\theta - \phi)$ (where $V_q$ is the q-axis component of the system voltage; $V_g$ is the system voltage; θ is an estimated phase of the system voltage; and φ is the phase of the system voltage), and obtain the angular velocity ω and the phase θ of the system voltage by performing an arithmetic operation of inputting the calculation result as a phase detection error (θ−φ) into the phase detection loop. This makes it possible to properly obtain the angular velocity ω and the phase θ of the system voltage from the q-axis component $V_q$ of the system voltage.

[Verification Experiment]

Figure 10:
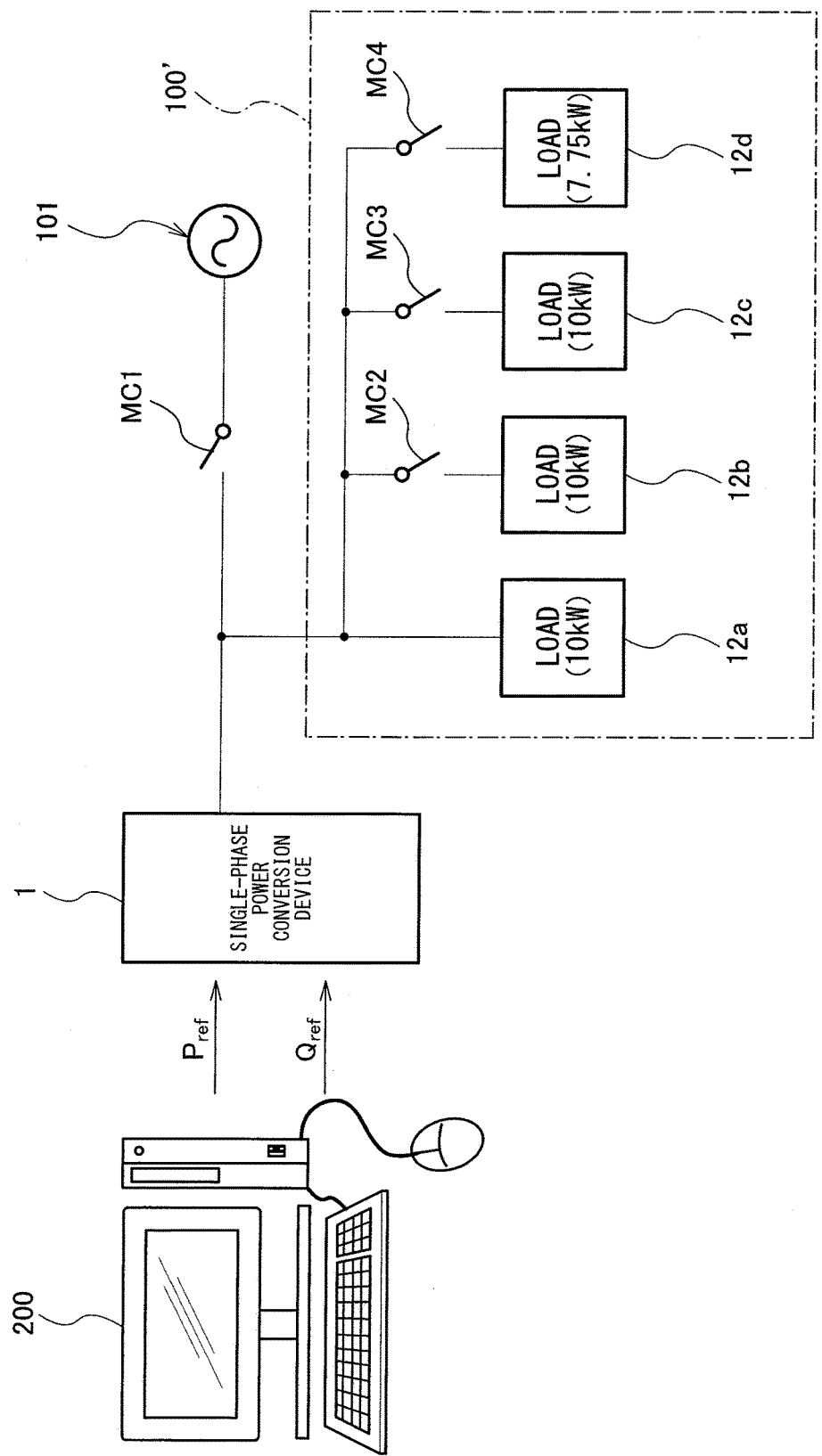
FIG. 10 is a schematic diagram of a test system for the power conversion device of Embodiment 1.

The inventors of the present invention conducted an experiment under predetermined conditions for the purpose of verifying the advantages of the power conversion device 1 of the present embodiment. FIG. 10 is a schematic diagram of a test system for the power conversion device 1. As shown in FIG. 10, the test system includes: a commercial single-phase electrical grid 101; the power conversion device 1 connected to the commercial single-phase electrical grid 101; a single-phase power system 100' simulating a micro-grid; switches MC1 to MC4; and a monitoring device 200, which supplies an active power command value $P_{ref}$ and a reactive power command value $Q_{ref}$ to the power conversion device 1. The single-phase power system 100' includes only loads 12a to 12d of the power conversion device 1.

The fundamental frequency of each of the commercial single-phase electrical grid 101 and the single-phase power system 100' is 60 Hz. The rated capacity of the power conversion device 1 is 50 kVA. Each of the loads 12a to 12c is 10 kW, and the load 12d is 7.75 kW. The switches MC1 to MC4 are magnet contactors, and switching between ON and OFF is manually performed.

In the experiment, first, the active power command value $P_{ref}$ and the reactive power command value $Q_{ref}$ were supplied to the power conversion device 1 by the monitoring device 200 to perform grid-interconnected operation. Then, the switches were turned ON and OFF to vary the load 12 of the power conversion device 1, and also, the power conversion device 1 was disconnected from the commercial single-phase electrical grid 101 to shift to self-sustained operation. The active power command value was increased in accordance with addition of loads. It should be noted that, in the verification experiment, the reactive power command value $Q_{ref}$ was always set to zero. Table 1 shows shifting of the operation state in the experiment.

TABLE 1

Active power command value, Interconnected/self-sustained operation, Load variation
(Reactive power command value $Q_{ref}$ was always 0 kVA)

| Time [s] | Active power command value $P_{ref}$ | Interconnected/ self-sustained | Load |
|---|---|---|---|
| 0 | $P_{ref}$ = 0 kW | Interconnected (MC1: Closed) | 10 kW (MC2: Open, MC3: Open, MC4: Open) |
| 5 | $P_{ref}$ = 10 kW | Interconnected (MC1: Closed) | 10 kW (MC2: Open, MC3: Open, MC4: Open) |
| 9 | $P_{ref}$ = 10 kW | Interconnected (MC1: Closed) | 20 kW (MC2: Closed, MC3: Open, MC4: Open) |
| 10 | $P_{ref}$ = 20 kW | Interconnected (MC1: Closed) | 20 kW (MC2: Closed, MC3: Open, MC4: Open) |
| 14 | $P_{ref}$ = 20 kW | Interconnected (MC1: Closed) | 30 kW (MC2: Closed, MC3: Closed, MC4: Open) |
| 15 | $P_{ref}$ = 30 kW | Interconnected (MC1: Closed) | 30 kW (MC2: Closed, MC3: Closed, MC4: Open) |

TABLE 1-continued

Active power command value, Interconnected/self-sustained operation, Load variation
(Reactive power command value $Q_{ref}$ was always 0 kVA)

| Time [s] | Active power command value $P_{ref}$ | Interconnected/ self-sustained | Load | |
|---|---|---|---|---|
| 20 | $P_{ref}$ = 30 kW | Self-sustained (MC1: Open) | 30 kW | (MC2: Closed, MC3: Closed, MC4: Open) |
| 26 | $P_{ref}$ = 30 kW | Self-sustained (MC1: Open) | 37.75 kW | (MC2: Closed, MC3: Closed, MC4: Closed) |

At the start of the experiment, MC1 was closed and MC2 to MC4 were open. In this case, since the power conversion device 1 was in the state of being connected only to the load 12a, the total load on the test system was 10 kW. Also, the active power command value $P_{ref}$ was set to 0 kW.

After five seconds had elapsed since the start of the experiment, the active power command value $P_{ref}$ was increased to 10 kW. After nine seconds had elapsed since the start of the experiment, MC2 was closed, and thereby the load 12b was added to the power conversion device 1. In this case, since the power conversion device 1 was in the state of being connected to the loads 12a and 12b, the total load was 20 kW.

Next, after 10 seconds had elapsed since the start of the experiment, the active power command value $P_{ref}$ was increased to 20 kW. After 14 seconds had elapsed since the start of the experiment, MC3 was closed, and thereby the load 12c was added to the power conversion device 1. In this case, since the power conversion device 1 was in the state of being connected to the loads 12a, 12b, and 12c, the total load on the test system was 30 kW.

Then, after 15 seconds had elapsed since the start of the experiment, the active power command value $P_{ref}$ was increased to 30 kW.

Subsequently, after 20 seconds had elapsed since the start of the experiment, an accident occurring in the commercial single-phase electrical grid 101 was simulated. MC1 was opened, and thereby the single-phase power system 101' was disconnected from the commercial single-phase electrical grid 100. In this case, the power conversion device 1 shifted from grid-interconnected operation to self-sustained operation in the state of being connected to the loads 12a, 12b, and 12c.

Next, after 26 seconds had elapsed since the start of the experiment, MC4 was additionally closed, and thereby the load 12d was added to the test system. In this case, since the power conversion device 1 was in the state of being connected to all of the loads 12a to 12d, the total load on the test system was 37.5 kW.

Figure 11A:
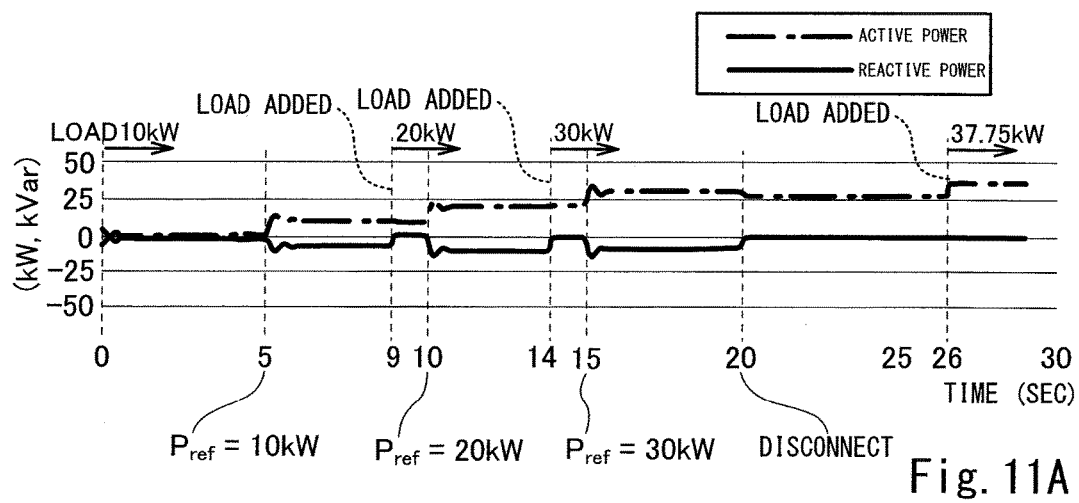
FIGS. 11A to 11C are graphs showing the results of a verification experiment conducted with the test system of FIG. 10.
Figure 11B:
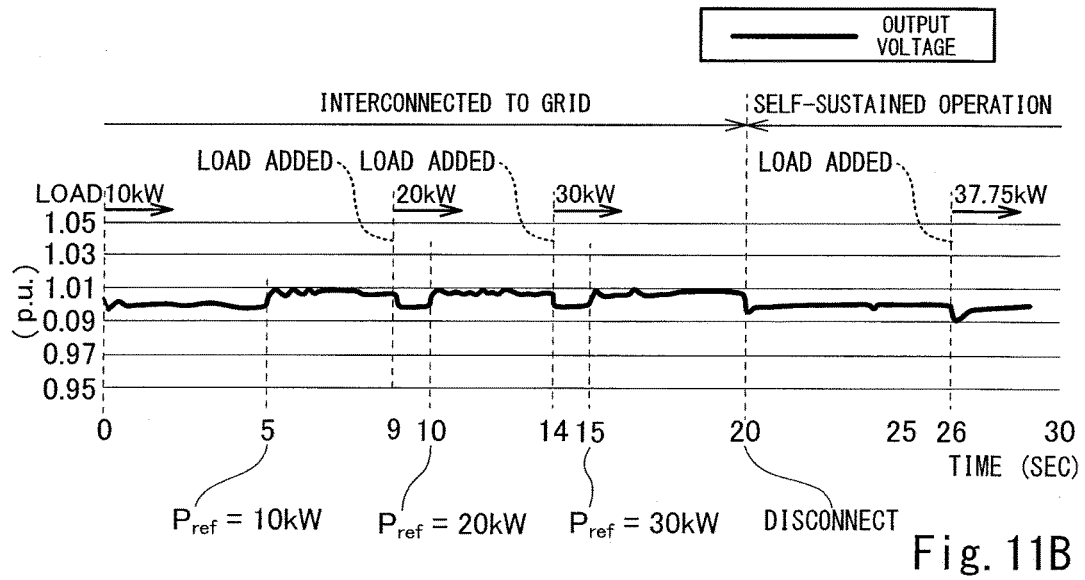
Figure 11C:
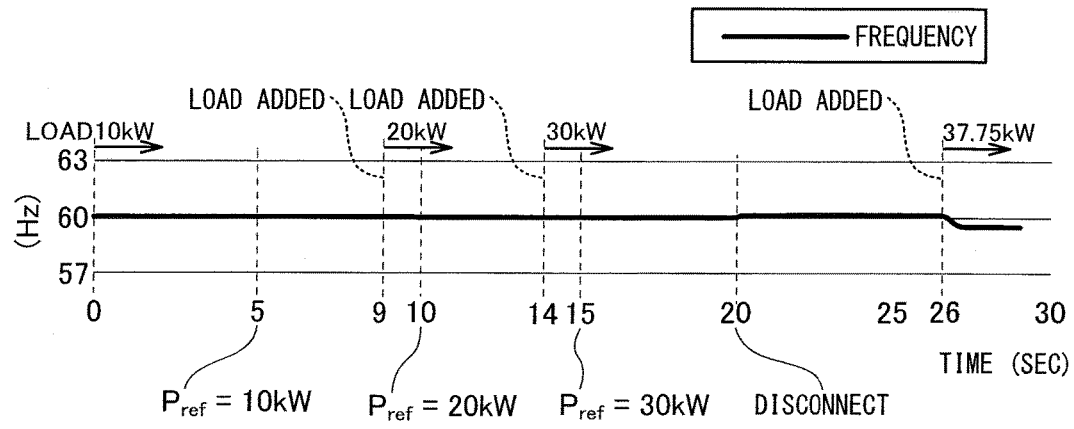

FIGS. 11A to 11C are graphs showing the results of the verification experiment. FIG. 11A, which is the upper diagram, shows response waveforms of output power. In FIG. 11A, a solid line indicates reactive power (kVar), and a one-dot chain line indicates active power (kW). FIG. 11B, which is the middle diagram, shows a response waveform of an output voltage (p.u.). FIG. 11C, which is the bottom diagram, shows a response waveform of a frequency (Hz). The time axes in FIGS. 11A to 11C coincide with one another.

FIGS. 11A to 11C show that, during grid-interconnected operation, the output from the power conversion device 1 followed the active power reference value $P_{ref}$ regardless of load variations, and that the grid covered the load variations. On the other hand, while the system was being disconnected from the grid and performing self-sustained operation, the power conversion device 1 outputted electric power in accordance with the load regardless of the active power reference value $P_{ref}$.

Figure 12A:
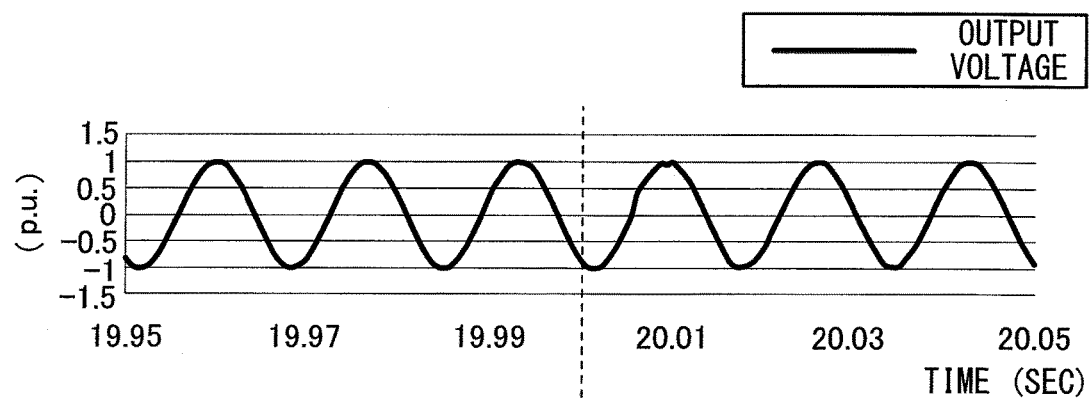
FIGS. 12A and 12B are graphs showing instantaneous response waveforms in the verification experiment conducted with the test system of FIG. 10.
Figure 12B:
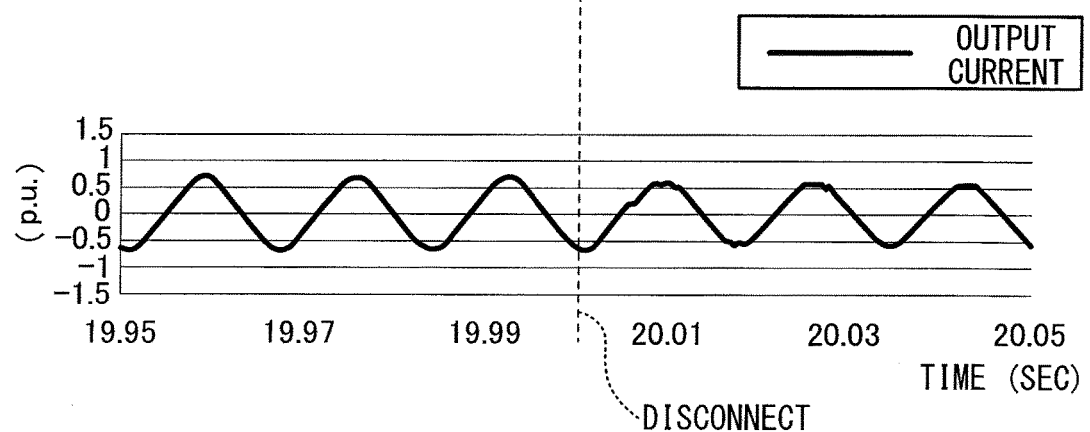

FIGS. 12A and 12B are graphs showing instantaneous response waveforms in the verification experiment. FIGS. 12A and 12B show the waveforms of the output current and output voltage immediately before and after the disconnection of the power conversion device 1 from the grid (about 20 seconds after the start of the experiment). No current or voltage variation occurred immediately before and after the disconnection of the power conversion device 1. This shows that load sharing with the grid during the interconnected operation, a shift from the interconnected operation to self-sustained operation, and continuation of the self-sustained operation thereafter were performed favorably, and also shows that no changeover of control of the power conversion device 1 was necessary between the interconnected operation and the self-sustained operation.

(Embodiment 2)

Next, Embodiment 2 of the present invention is described with reference to FIG. 13 and FIG. 14. In Embodiment 2, the description of configurations common between Embodiment 1 and Embodiment 2 are omitted, and differences in configuration from Embodiment 1 are only described in Embodiment 2.

Embodiment 2 is different from Embodiment 1 in that, in Embodiment 2, feedback control of the single-phase system current is performed by using d-axis and q-axis components of the system current that are obtained based on FAE (Fictive Axis Emulation) operation.

Figure 13:
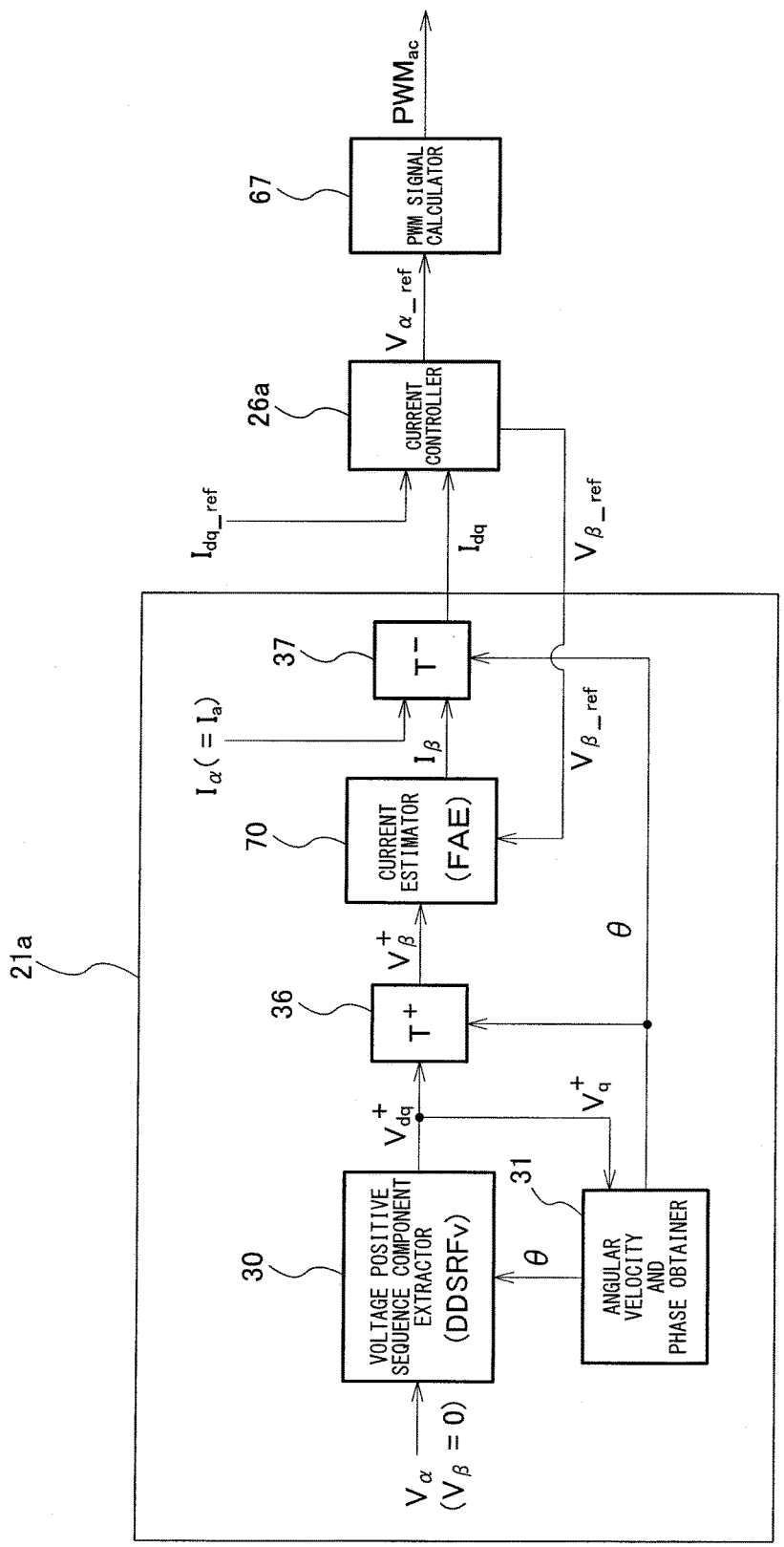
FIG. 13 is a block diagram showing the configuration of current feedback control of a power conversion device according to Embodiment 2 of the present invention.

FIG. 13 is a block diagram showing the configuration of current feedback control of a power conversion device according to Embodiment 2 of the present invention. As shown in FIG. 13, a current controller 26a is configured to generate an α-axis voltage command value $V_{\alpha\_ref}$ and a β-axis voltage command value $V_{\beta\_ref}$ of a rest frame based on feedback current values $I_{dq}$ and the current command values $I_{dq\_ref}$ calculated by the generator model 25, and generate a PWM signal $PWM_{ac}$ based on the α-axis voltage command value $V_{\alpha\_ref}$.

A voltage and current measurer 21a according to the present embodiment includes: a rotational coordinate transformer (which may also be referred to as an inverse dq transformer) 36, a β-axis current calculator 70, and a rotational coordinate transformer (which may also be referred to as a dq transformer) 37. The inverse dq transformer 36 calculates a β-axis voltage $V_\beta^+$ from the d-axis and q-axis components $V_{dq}^+$ of the system voltage by performing rest-frame transformation using the phase θ. The β-axis current calculator 70 calculates a β-axis current $I_\beta$ by performing FAE operation based on the β-axis voltage $V_\beta^+$ calculated by the inverse dq transformer 36 and the β-axis voltage command value $V_{\beta\_ref}$ generated by the current controller 26a. The dq transformer 37 converts the α-axis current $I_α$ (=$I_a$), which is the single-phase system current, and the β-axis current $I_β$ calculated by the β-axis current calculator 70 into d-axis and q-axis components $I_{dq}$ of the system current by using the phase θ, and outputs the d-axis and q-axis components $I_{dq}$ of the system current to the current controller 26a as feedback current values.

Figure 14:
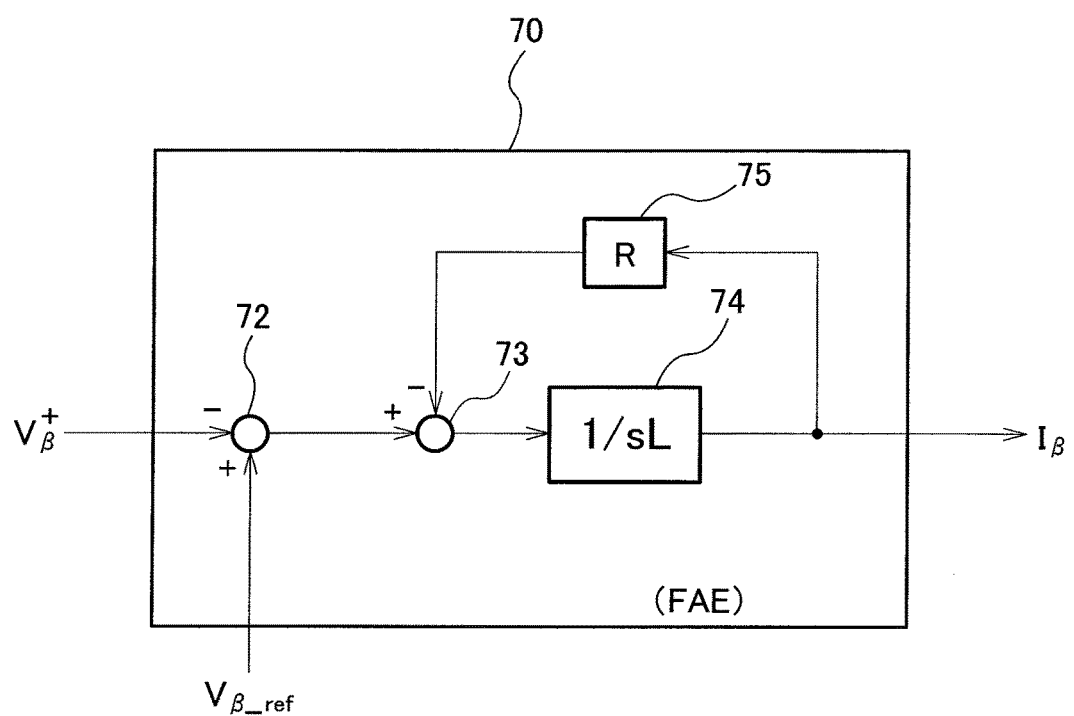
FIG. 14 is a circuit diagram showing the configuration of a current estimator of FIG. 13.

FIG. 14 is a circuit diagram showing the configuration of the β-axis current calculator 70 of FIG. 13. As shown in FIG. 14, the β-axis current calculator 70 includes adder-subtracters 72 and 73, an arithmetic operation block 74, and a feedback block 75. In FIG. 14, L of the block 74 and R of the block 75 represent an inductance component and a resistance component of the system as seen from the power converter 2. An arithmetic operation of calculating a response of the single-phase system, for which an imaginary axis perpendicular thereto is thus assumed, is herein called FAE operation. According to this configuration, proper feedback control of the single-phase system current can be performed by using the d-axis and q-axis components of the system current, which are obtained based on the FAE operation. The configuration for performing the FAE operation is not limited to the one shown in FIG. 14, but may be any configuration, so long as the β-axis current $I_β$ can be estimated from the β-axis voltage $V_β^+$ of the system, which is a positive sequence component obtained by DDSRF, and the β-axis voltage command value $V_{β\_ref}$, which is obtained by the current control system.

(Other Embodiments)

Embodiments 1 and 2 adopt a phase (angular velocity) detection circuit to which the DDSRF operation is applied. However, the phase (angular velocity) detection circuit is not thus limited, but may be configured differently, so long as the phase (angular velocity) detection circuit obtains, from a single-phase system voltage, the angular velocity and the phase of the system voltage by an estimation operation that uses the phase of the system voltage as a parameter.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

INDUSTRIAL APPLICABILITY

The power conversion device according to the present invention can be used as a power conversion device having an interconnected operation function, i.e., a function to realize operation interconnecting with an electrical grid.

REFERENCE SIGNS LIST 1 power conversion device
2 power converter
3 control device
4 DC power supply
5 output line
6 output reactor
7 current sensor
8 filter capacitor
9 transformer
10 voltage sensor
11 power distribution line of single-phase power system
12 load
20 generator controller
21 voltage and current measurer
22 power obtainer
23 governor model
24 AVR model
25 generator model
26 current controller
30 voltage positive sequence component extractor
31 angular velocity and phase obtainer
32 current positive sequence component extractor
67 PWM signal calculator
70 current estimator (FAE)
71 current/voltage transformer
100 single-phase power system
200 monitoring device

The invention claimed is:

1. A power conversion device comprising:
a power converter configured to convert DC power into single-phase AC power and output the AC power to an output line connected to a single-phase power system; and
a control device configured to control the power converter such that the power converter operates as a virtual synchronous generator, wherein
the control device includes:
a voltage measurer configured to measure a single-phase system voltage, which is a system voltage of the single-phase power system, and from the measured single-phase system voltage, obtain an angular velocity and a phase of the system voltage by an estimation operation that uses the phase of the system voltage as a parameter;
a power obtainer configured to obtain active power and reactive power of the single-phase power system;
a governor model configured to calculate a phase difference based on a deviation of the active power obtained by the power obtainer from an active power command value, a drooping characteristic of the virtual synchronous generator, and the angular velocity;
an AVR model configured to calculate an absolute value of an induced voltage of the virtual synchronous generator based on a deviation of the reactive power obtained by the power obtainer from a reactive power command value and the system voltage that is based on the measurement by the voltage measurer;
a generator model configured to calculate current command values corresponding to an armature current of the virtual synchronous generator based on the phase difference calculated by the governor model, the absolute value of the induced voltage calculated by the AVR model, d-axis and q-axis components of the system voltage that correspond to the phase, and an impedance of the virtual synchronous generator; and
a current controller configured to generate a PWM signal based on the current command values calculated by the generator model, and output the PWM signal to the power converter.

2. The power conversion device according to claim 1, wherein
the voltage measurer includes:
a voltage positive sequence component extractor configured to extract, from the measured single-phase system voltage, positive sequence d-axis and q-axis components of the system voltage (hereinafter, simply referred to as d-axis and q-axis components of the system voltage) by DDSRF operation; and an angular velocity and phase obtainer configured to obtain the angular velocity and the phase of the system voltage by using the q-axis component of the system voltage, which is extracted by the voltage positive sequence component extractor, wherein the voltage measurer is configured to extract the d-axis and q-axis components of the system voltage by using, in the DDSRF operation, the phase obtained by the angular velocity and phase obtainer.

3. The power conversion device according to claim 2, wherein the system voltage based on the measurement by the voltage measurer, which is used by the AVR model, is based on the d-axis and q-axis components of the system voltage that are extracted by the voltage positive sequence component extractor.

4. The power conversion device according to claim 2, wherein the d-axis and q-axis components of the system voltage that are used by the virtual generator model and that correspond to the phase are the d-axis and q-axis components of the system voltage that are extracted by the voltage positive sequence component extractor.

5. The power conversion device according to claim 2, wherein the control device further includes a current measurer configured to measure a single-phase system current, which is a system current of the single-phase power system, and from the measured single-phase system current, extract positive sequence d-axis and q-axis components of the system current (hereinafter, simply referred to as d-axis and q-axis components of the system current) by DDSRF operation, and the current controller performs feedback control of the single-phase system current by using, as feedback current values, the d-axis and q-axis components of the system current that are extracted by the current measurer.

6. The power conversion device according to claim 2, wherein the current controller is configured to generate an $\alpha$-axis voltage command value and a $\beta$-axis voltage command value of a rest frame based on feedback current values and the current command values calculated by the generator model, and generate the PWM signal based on the $\alpha$-axis voltage command value, and the voltage measurer is a voltage and current measurer including:

an inverse dq transformer configured to calculate a $\beta$-axis voltage from the d-axis and q-axis components of the system voltage by performing rest-frame transformation using the phase;

a $\beta$-axis current calculator configured to calculate a $\beta$-axis current by performing FAE operation based on the $\beta$-axis voltage calculated by the inverse dq transformer and the $\beta$-axis voltage command value generated by the current controller; and a dq transformer configured to measure a single-phase system current, which is a system current of the single-phase power system, convert an $\alpha$-axis current, which is the measured single-phase system current, and the $\beta$-axis current calculated by the $\beta$-axis current calculator into d-axis and q-axis components of the system current by using the phase, and output the d-axis and q-axis components of the system current to the current controller as the feedback current values.

7. The power conversion device according to claim 2, wherein the angular velocity and phase obtainer is configured to obtain an angular velocity $\omega$ and a phase $\theta$ of the system voltage by an arithmetic operation of inputting the q-axis component of the system voltage as a phase detection error ($\theta-\phi$) (where $\theta$ is an estimated phase of the system voltage and $\phi$ is the system voltage) into a phase detection loop including the voltage measurer.

8. The power conversion device according to claim 3, wherein the d-axis and q-axis components of the system voltage that are used by the virtual generator model and that correspond to the phase are the d-axis and q-axis components of the system voltage that are extracted by the voltage positive sequence component extractor.

9. The power conversion device according to claim 3, wherein the angular velocity and phase obtainer is configured to obtain an angular velocity $\omega$ and a phase $\theta$ of the system voltage by an arithmetic operation of inputting the q-axis component of the system voltage as a phase detection error ($\theta-\phi$) (where $\theta$ is an estimated phase of the system voltage and $\phi$ is the system voltage) into a phase detection loop including the voltage measurer.

10. The power conversion device according to claim 4, wherein the angular velocity and phase obtainer is configured to obtain an angular velocity $\omega$ and a phase $\theta$ of the system voltage by an arithmetic operation of inputting the q-axis component of the system voltage as a phase detection error ($\theta-\phi$) (where $\theta$ is an estimated phase of the system voltage and $\phi$ is the system voltage) into a phase detection loop including the voltage measurer.

11. The power conversion device according to claim 5, wherein the angular velocity and phase obtainer is configured to obtain an angular velocity $\omega$ and a phase $\theta$ of the system voltage by an arithmetic operation of inputting the q-axis component of the system voltage as a phase detection error ($\theta-\phi$) (where $\theta$ is an estimated phase of the system voltage and $\phi$ is the system voltage) into a phase detection loop including the voltage measurer.

12. The power conversion device according to claim 6, wherein the angular velocity and phase obtainer is configured to obtain an angular velocity $\omega$ and a phase $\theta$ of the system voltage by an arithmetic operation of inputting the q-axis component of the system voltage as a phase detection error ($\theta-\phi$) (where $\theta$ is an estimated phase of the system voltage and $\phi$ is the system voltage) into a phase detection loop including the voltage measurer.

13. The power conversion device according to claim 8, wherein the angular velocity and phase obtainer is configured to obtain an angular velocity $\omega$ and a phase $\theta$ of the system voltage by an arithmetic operation of inputting the q-axis component of the system voltage as a phase detection error ($\theta-\phi$) (where $\theta$ is an estimated phase of the system voltage and $\phi$ is the system voltage) into a phase detection loop including the voltage measurer.

* * * * *